US008920042B2

(12) United States Patent
Aoki et al.

(10) Patent No.: US 8,920,042 B2
(45) Date of Patent: Dec. 30, 2014

(54) OPTICAL CONNECTOR, OPTICAL FIBER INCORPORATING METHOD, AND ELECTRONIC INFORMATION EQUIPMENT

(75) Inventors: Tsuyoshi Aoki, Kawasaki (JP); Shigenori Aoki, Kawasaki (JP); Hidenobu Muranaka, Kawasaki (JP); Mitsuhiro Iwaya, Tokyo (JP); Tsunetoshi Saito, Tokyo (JP); Katsuki Suematsu, Tokyo (JP)

(73) Assignees: Fujitsu Limited, Kawasaki (JP); Furukawa Electric Co., Ltd., Tokyo (JP)

( * ) Notice: Subject to any disclaimer, the term of this patent is extended or adjusted under 35 U.S.C. 154(b) by 349 days.

(21) Appl. No.: 13/359,871

(22) Filed: Jan. 27, 2012

(65) Prior Publication Data

US 2012/0237168 A1   Sep. 20, 2012

(30) Foreign Application Priority Data

Mar. 17, 2011   (JP) .................. 2011-059777

(51) Int. Cl.
*G02B 6/36* (2006.01)
*G02B 6/38* (2006.01)
*G02B 6/43* (2006.01)

(52) U.S. Cl.
CPC ............... *G02B 6/3821* (2013.01); *G02B 6/43* (2013.01); *G02B 6/3823* (2013.01)
USPC .......................................................... 385/53

(58) Field of Classification Search
None
See application file for complete search history.

(56) References Cited

U.S. PATENT DOCUMENTS

| 4,102,561 | A  | * | 7/1978  | Hawk et al. ...................... 385/59 |
| 5,694,506 | A  | * | 12/1997 | Kobayashi et al. ............. 385/60 |
| 6,491,442 | B1 | * | 12/2002 | Murakami et al. .............. 385/58 |
| 6,582,134 | B2 | * | 6/2003  | Otera ............................... 385/65 |
| 6,951,425 | B2 | * | 10/2005 | Vergeest ......................... 385/59 |
| 7,458,729 | B2 | * | 12/2008 | Sasaki et al. .................... 385/55 |
| 7,657,136 | B2 |   | 2/2010  | Matsuoka et al. |
| 2002/0085814 | A1 | * | 7/2002  | Otsu et al. ....................... 385/59 |
| 2002/0131718 | A1 | * | 9/2002  | Tsuchida et al. ................ 385/55 |
| 2006/0147156 | A1 | * | 7/2006  | Tsuchida et al. ................ 385/71 |
| 2007/0086707 | A1 | * | 4/2007  | Suzuki et al. ................... 385/58 |

(Continued)

FOREIGN PATENT DOCUMENTS

CN    1993639       7/2007
JP    8-334653  A  * 12/1996

(Continued)

OTHER PUBLICATIONS

Notification of the First Office Action issued Jan. 2, 2014 by The State Intellectual Property Office of the People's Republic of China in counterpart application No. 201210021137.6 with English translation.

(Continued)

*Primary Examiner* — Mike Stahl
(74) *Attorney, Agent, or Firm* — Kratz, Quintos & Hanson, LLP

(57) ABSTRACT

An optical connector includes a fiber holder with guide holes for guiding optical fibers, a space communicating with the guide holes and to accommodate the optical fibers, and a deformable member that forms at least a part of the fiber holder and causes the space to deform or displace to allow a part or all of the optical fibers to bend in the space.

20 Claims, 24 Drawing Sheets

(56) References Cited

U.S. PATENT DOCUMENTS

| | | | |
|---|---|---|---|
| 2011/0243504 A1* | 10/2011 | Matsui | 385/74 |
| 2012/0033920 A1* | 2/2012 | Haley et al. | 385/78 |
| 2013/0084045 A1* | 4/2013 | Aoki et al. | 385/92 |

FOREIGN PATENT DOCUMENTS

| | | |
|---|---|---|
| JP | 10-90558 | 4/1998 |
| JP | 11-337760 A | 12/1999 |
| JP | 3363479 B2 | 1/2003 |
| JP | 2005-091764 A | 4/2005 |
| JP | 2011-059137 | 3/2011 |
| JP | 4646263 B1 | 3/2011 |
| WO | 2006/035499 A1 | 4/2006 |
| WO | 2011-018996 | 2/2011 |

OTHER PUBLICATIONS

Japanese Office Action dated Oct. 21, 2014 in the corresponding Japanese patent application No. 2011-059777, with a partial English translation.

* cited by examiner

FIG.4A
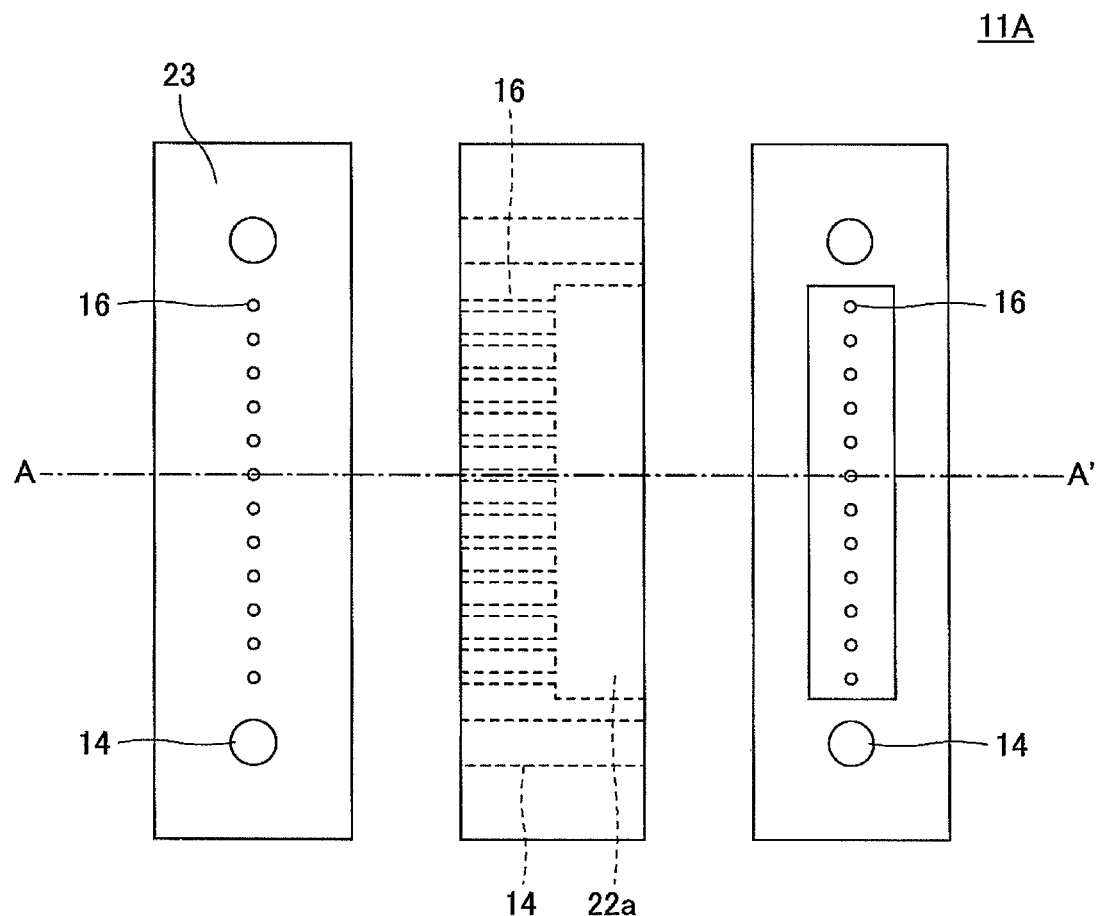
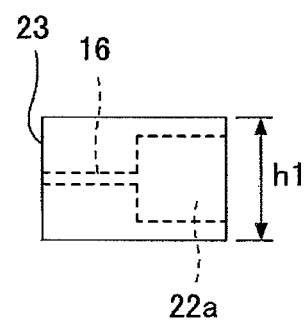

FIG.4C
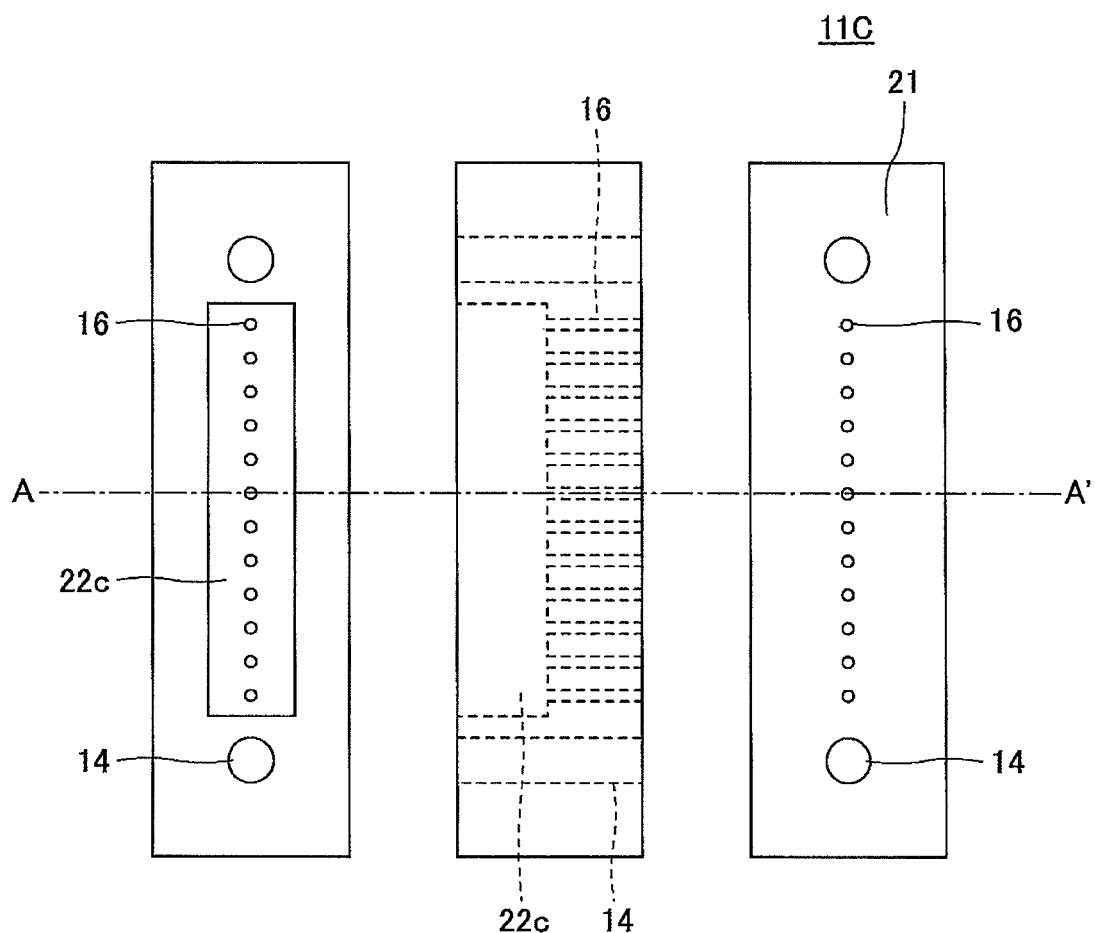
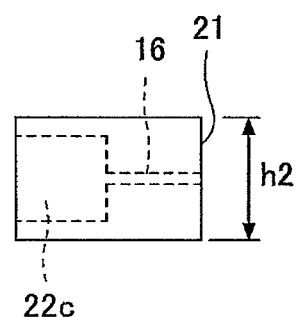

FIG.5A
(A)
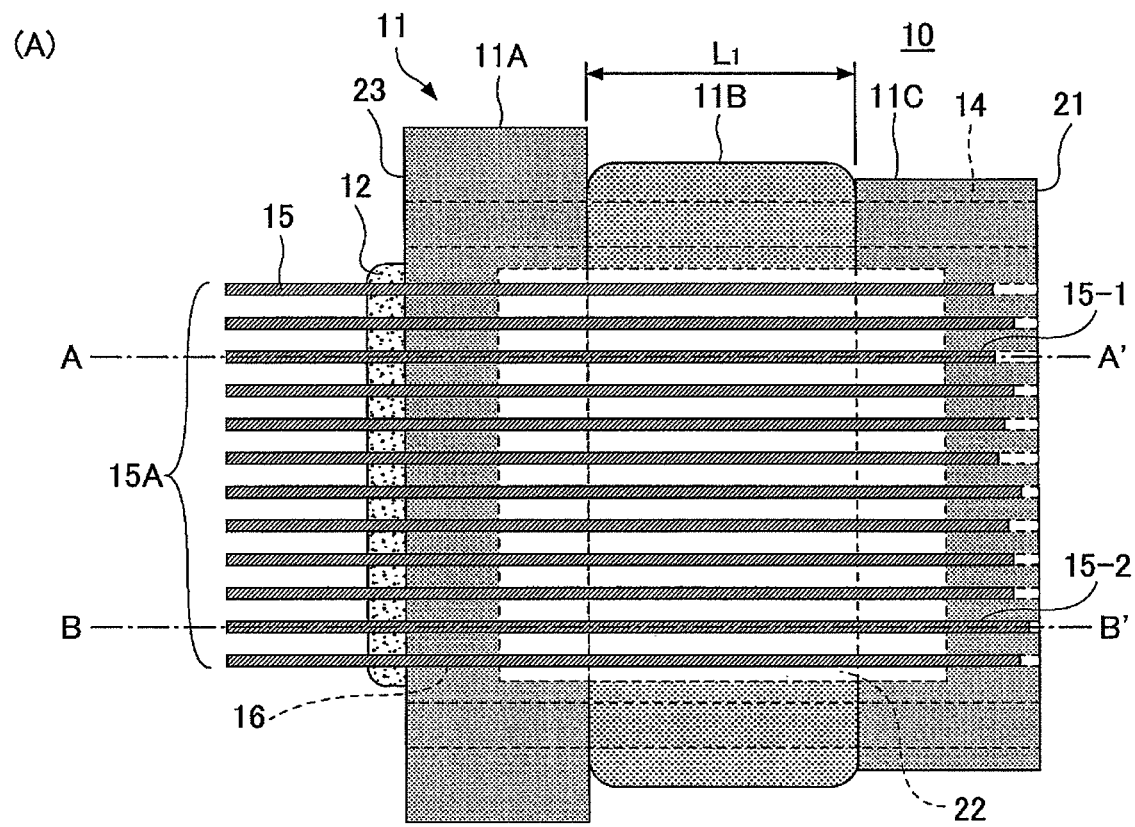
(B) CROSS-SECTION A-A'
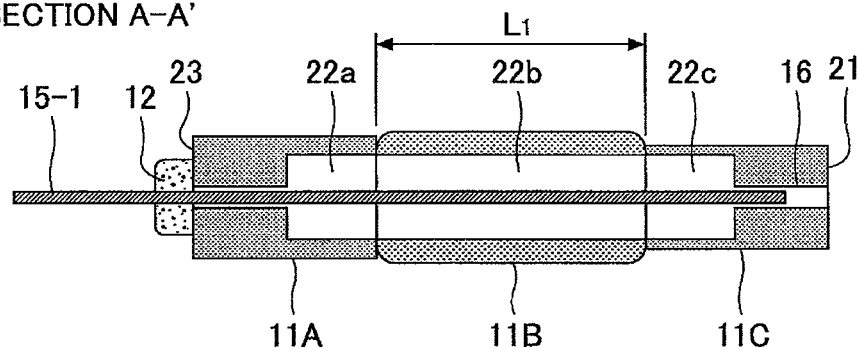
(C) CROSS SECTION B-B'
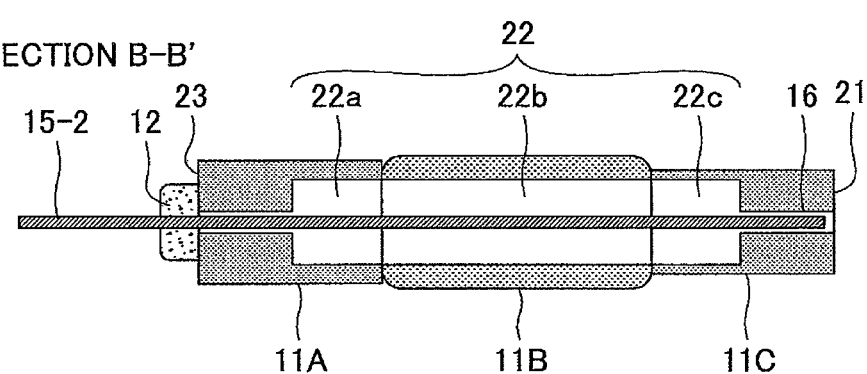

FIG.5B
(A)
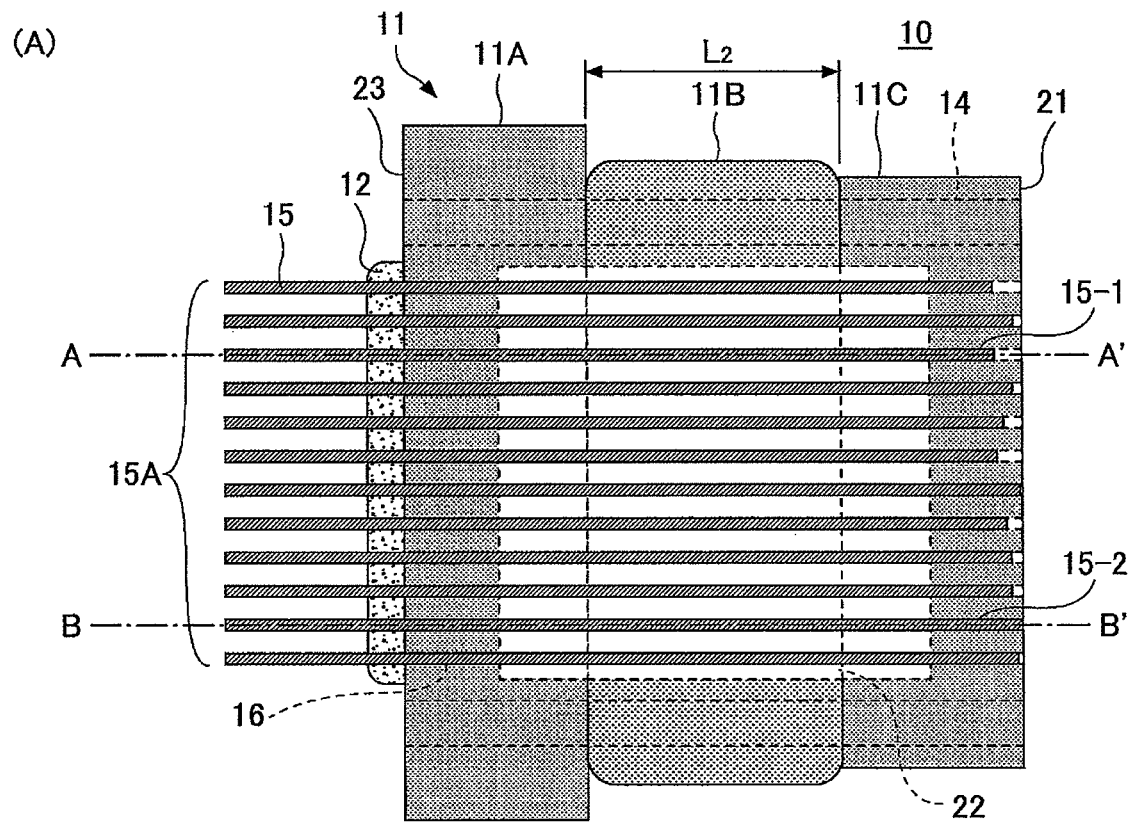
(B) CROSS-SECTION A-A'
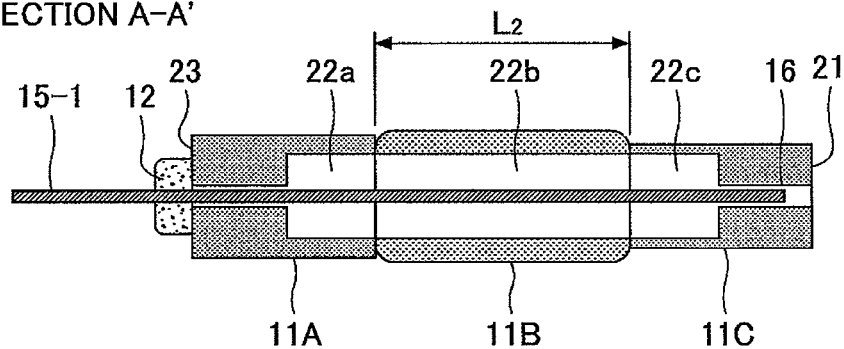
(C) CROSS SECTION B-B'
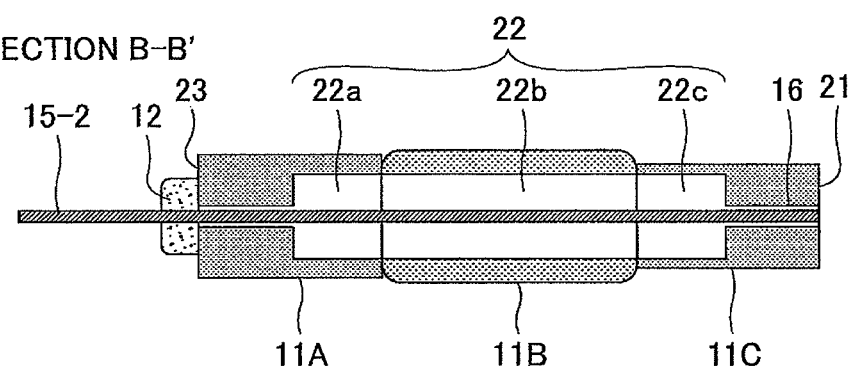

FIG.5C
(A)
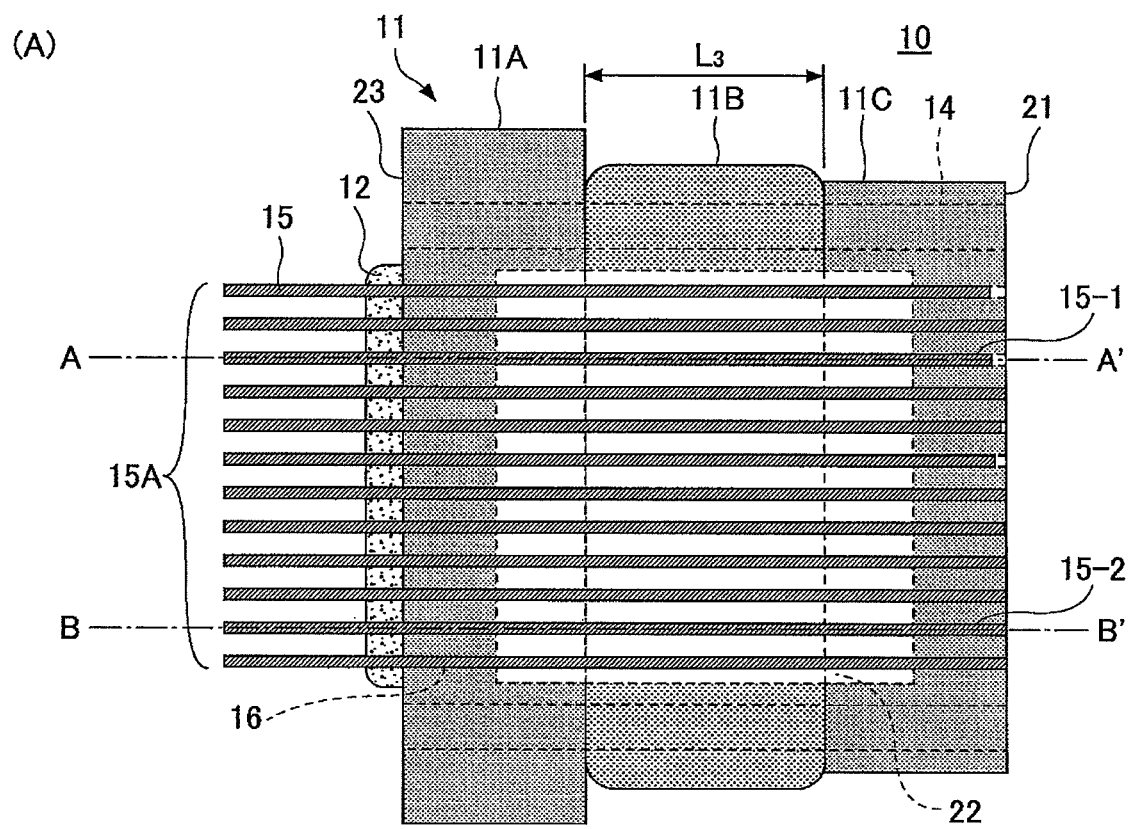
(B) CROSS-SECTION A-A'
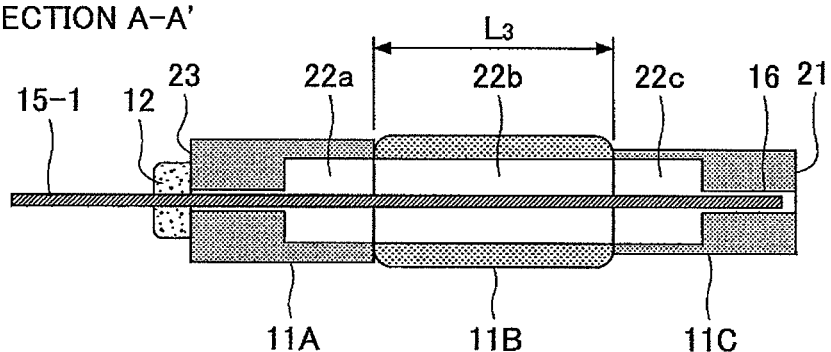
(C) CROSS SECTION B-B'
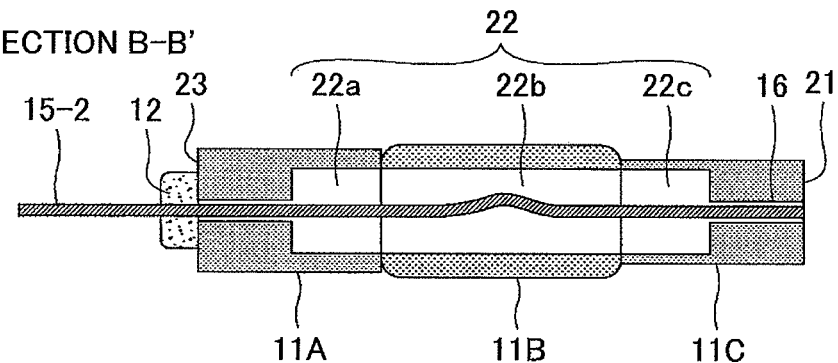

FIG.5D
(A)
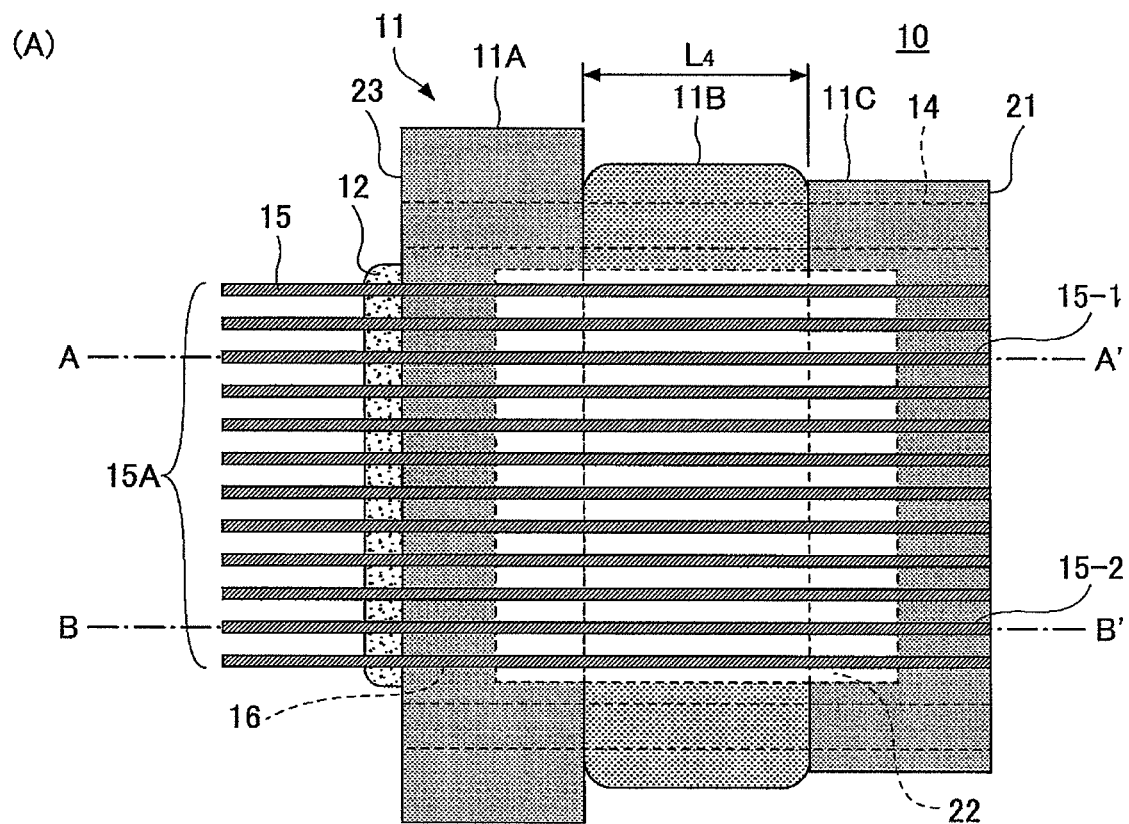
(B) CROSS-SECTION A-A'
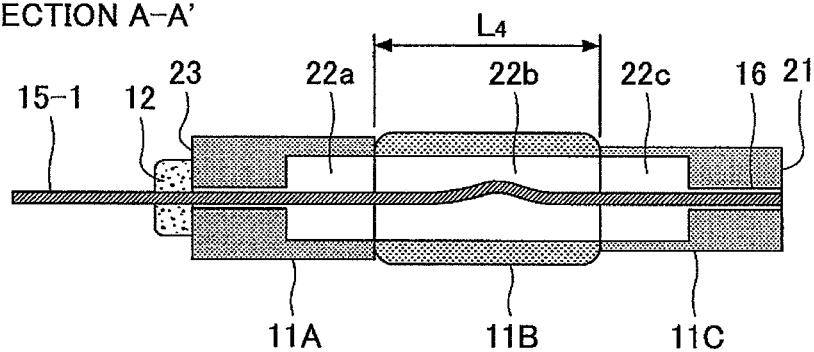
(C) CROSS SECTION B-B'
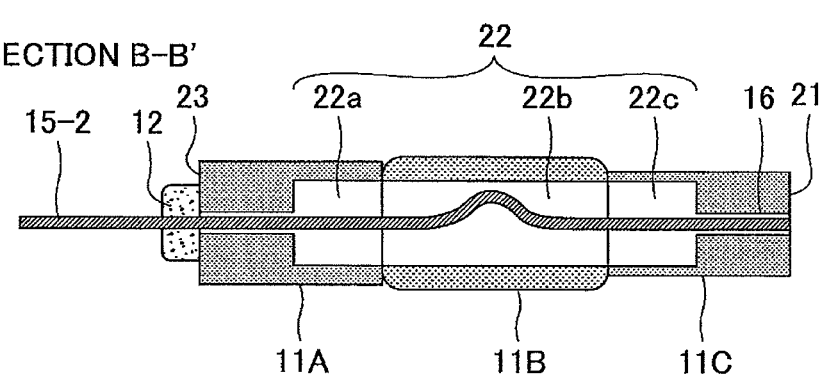

FIG.8
(A)
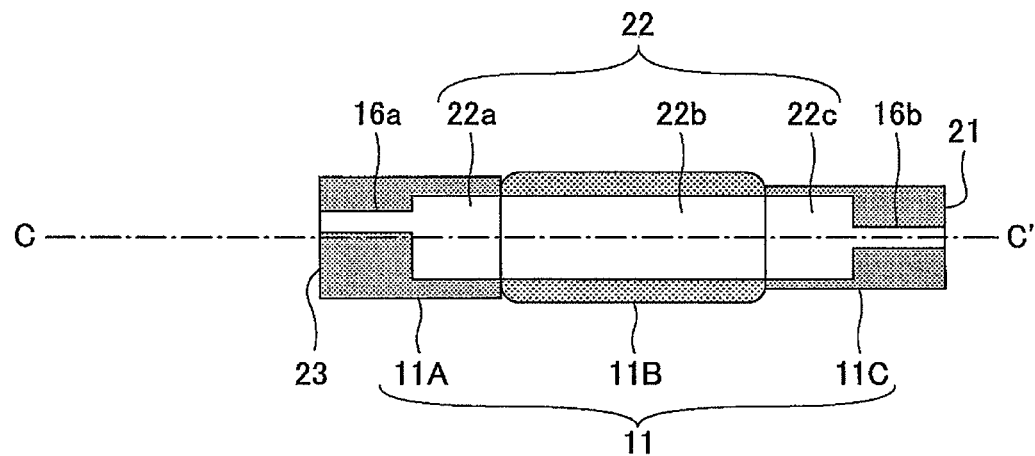
(B)
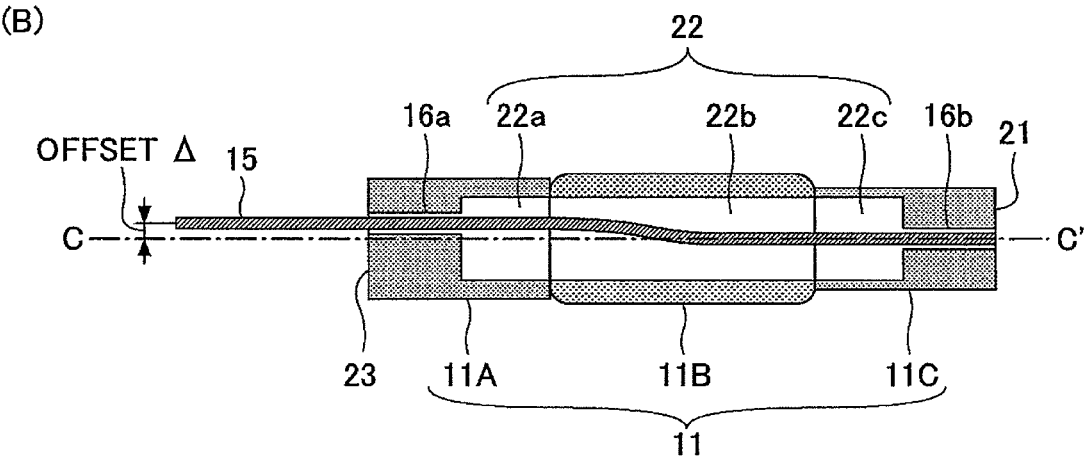
(C)
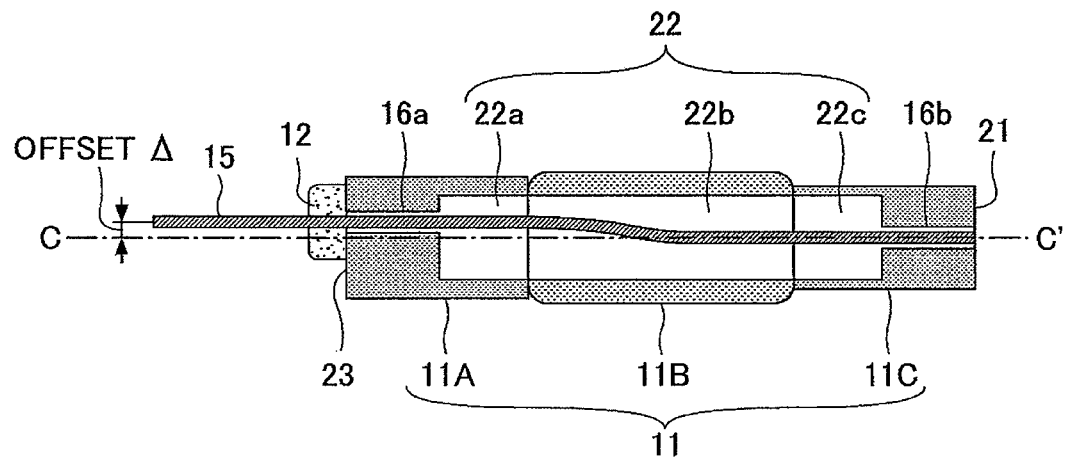

FIG.16
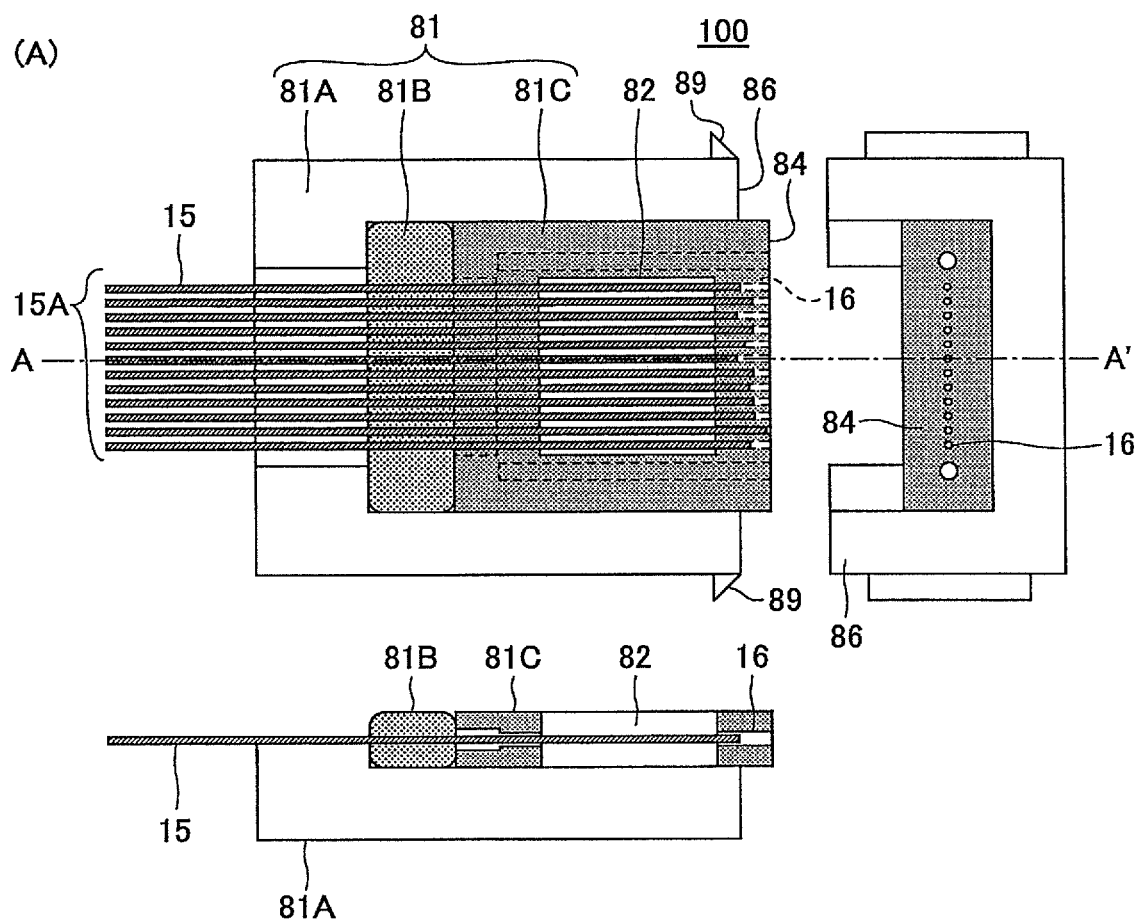
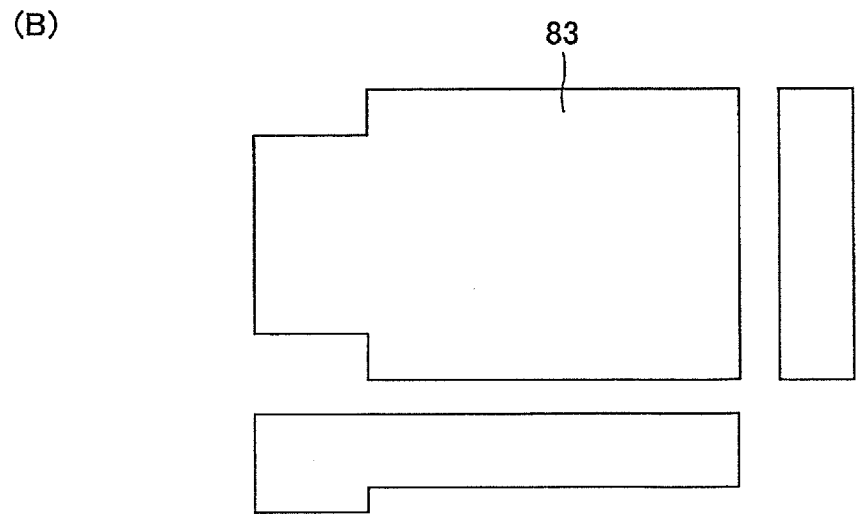

OPTICAL CONNECTOR, OPTICAL FIBER INCORPORATING METHOD, AND ELECTRONIC INFORMATION EQUIPMENT

CROSS REFERENCE TO RELATED APPLICATIONS

This application is based upon and claims the benefit of priority of the prior Japanese Patent Application No. 2011-059777 filed on Mar. 17, 2011, the entire contents of which are incorporated herein by references.

FIELD

The embodiments discussed herein relate to an optical connector, an optical fiber incorporating method, and electronic information equipment.

BACKGROUND

In recent years and continuing, data transmission rates between LSI chips/packages or between LSI and memory or storage go on increasing in the technological field of supercomputers or servers. Along with the increase of data transmission rates, serious issues such as degradation in signal waveforms and increase of power consumption become conspicuous in the conventional electric interconnects. To solve theses issues, optical interconnection using broadband optical transmission channels has been attracting attention as a new interconnection medium to realize a high-capacity data transmission at less power consumption.

In inter-board LSI connection making use of optical interconnection, many optical devices including light-emitting devices for converting electric signals to optical signals and photosensitive devices for performing opposite functions are arranged on a board. It is proposed to mutually connect these optical devices using optical transmission media such as fiber optic cables or optical waveguides. To allow expansion and maintenance of hardware systems in supercomputers or servers, LSI-mounting boards are attached to or detached from a system. It is desired that optical transmission media (paths) are also connected to or disconnected from the system during the system expansion or system maintenance. For this reason, there is demand in the technological field of optical interconnects to develop not only optical devices or optical transmission media, but also plug-in optical connectors.

Optical interconnections of supercomputers or servers have a huge number of optical transmission paths. Many inventions have been made on multi-fiber optical connectors for mutually connecting multi-channel transmission paths mainly in the fiber optic telecommunications field. A widely used standard of multi-fiber optical connector is a mechanical transferable (MT) ferrule-based connector which is of a direct contact type to bring optical fibers to face-to-face contact with those of a counterpart connector. See, for example, Patent Document 1 listed below. Many optical fibers are aligned in a MT ferrule at a prescribed pitch. Two facing ferrules are positioned with respect to each other using a guide pin furnished in one of the ferrules and a guide hole formed in the other ferrule. This method can bring a bundle of optical fibers of multi-core fiber optic cables to direct contact with each other at a time and at a low loss during connection.

However, applying a telecommunication-type MT ferrule-based connector to optical interconnection using a huge number of connectors will generate high cost. In a MT ferrule, optical fibers projecting from the front end of the ferrule are cut into a uniform length so as to slightly project from the front end at a constant length, for the purpose of reducing fluctuation in connection loss due to the unevenness of the fiber projection. In order to cut the optical fibers into a uniform length, high-precision physical contact (PC) polishing is performed. The PC polishing process incurs high costs, and accordingly, the assembling cost for incorporating optical fibers into a connector increases. During the polishing type assembling, fiber guide holes for introducing optical fibers are filled with an adhesive.

On the other hand, a method and a structure of connecting an unpolished optical fiber of a single-fiber connector to a counterpart optical fiber are known. The unpolished optical fiber is pulled out in advance from the front end of the ferrule. This arrangement can prevent the optical fiber from retreating inside the ferrule due to thermal deformation of the fiber. An elastic material (a deformation absorber) is provided at the rear end of the ferrule so as to press the optical fiber. See, for example, Patent Document 2 listed below. When two ferrules are pressed against each other, the facing unpolished optical fibers come into contact and retreat inside the ferrules, while pushing and elastically deforming the elastic material until the tips of the optical fibers are aligned with the front ends of the corresponding ferrules. In order to employ this structure in a multi-core MT ferrule, the projecting lengths of multiple optical fibers are made uniform as in the polishing type connectors.

Accordingly, it is desired to provide an inexpensive optical connector that assures reliable optical connection at low loss, compensating for unevenness of the fiber projecting length, even if the polishing process of optical fibers at the front end of the ferrule is omitted after incorporation of the optical fibers.

PRIOR ART DOCUMENT

Patent Document 1: Japanese Patent No. 3363479
Patent Document 2: Japanese Laid-open Publication No. H10-90558

SUMMARY

According to one aspect of the present disclosure, an optical connector is provided. The optical connector includes: a fiber holder with guide holes for guiding optical fibers; a space communicating with the guide holes and to accommodate the optical fibers; and a deformable member that forms at least a part of the fiber holder and causes the space to deform or displace to allow a part or all of the optical fibers to bend in the space.

According to another aspect of the present disclosure, an optical fiber incorporating method is provided. The method includes: inserting optical fibers into associated fiber guide holes of an optical connector through an internal space of the optical connector, the optical fibers having cut ends having been cut collectively; holding the optical fibers in the fiber guide holes, the optical fibers being retracted behind a contact face of the optical connector in a disconnected state of the optical fibers; and deforming the internal space of the optical connector to cause the optical fibers to move forward relative to the contact face of the optical connector, while allowing the optical fibers with surplus lengths to bend in the internal space, when the optical connector is connected to a counterpart connector.

The object and advantages of the invention will be realized and attained by means of the elements and combinations particularly pointed out in the claims.

It is to be understood that both the foregoing general description and the following detailed description are exemplary and explanatory and are not restrictive to the invention as claimed.

BRIEF DESCRIPTION OF DRAWINGS

FIG. 4A illustrates in four orthogonal views a ferrule member A constituting a part of the ferrule of FIG. 3;

FIG. 4C illustrates in four orthogonal views a ferrule member C constituting a part of the ferrule of FIG. 3;

FIG. 5A illustrates a mechanism for connecting the optical connector to a counterpart connector;

FIG. 5B illustrates the mechanism for connecting the optical connector to the counterpart connector;

FIG. 5C illustrates the mechanism for connecting the optical connector to the counterpart connector;

FIG. 5D illustrates the mechanism for connecting the optical connector to the counterpart connector;

FIG. 8 illustrates how the optical fibers are incorporated in the optical connector using the offset structure of FIG. 7;

FIG. 16 illustrates an optical connector according to the fifth embodiment;

DESCRIPTION OF EMBODIMENTS

Figure 1:
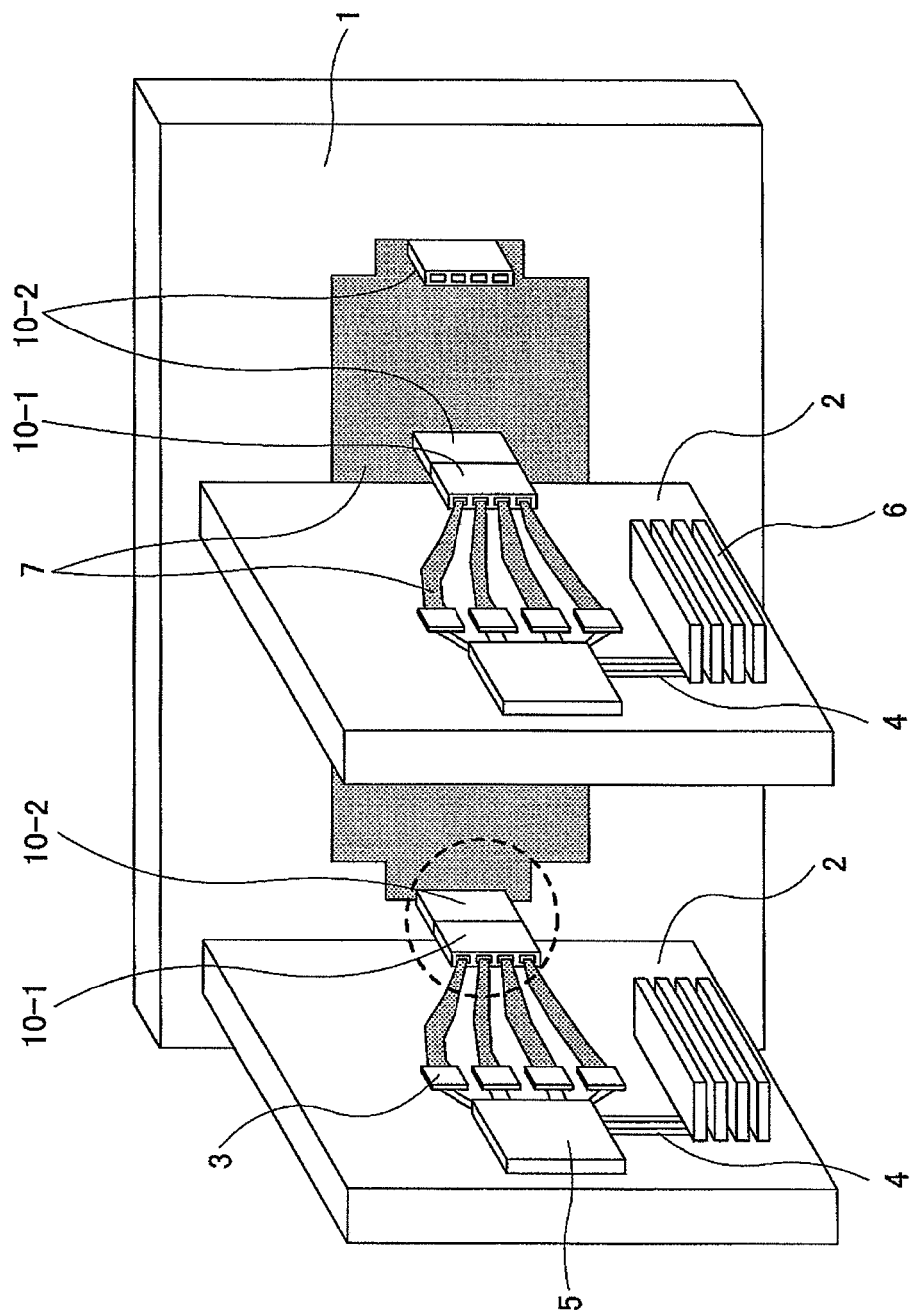
FIG. 1 illustrates an example of inter-board optical interconnect to which optical connectors of the embodiments are applied.

The embodiments are now described with reference to accompanying drawings. FIG. 1 is a schematic diagram illustrating inter-board optical interconnects, to which optical connectors 10-1 and 10-2 of the embodiment are applied. In routers or servers, computer boards 2 (referred to simply as "board 2") are plugged parallel to each other in a backplane board 1 (referred to simply as "backplane 1"). The boards 2 are connected to an optical transmission path 7 formed in the backplane 1 via the optical connectors 10-1 and 10-2, respectively. Many devices such as an LSI device 5, a memory 6, or an optical module 3 are arranged on the board 2. An optical signal is supplied from the backplane 1 via the optical connector 10-1 (or 10-2) and an optical transmission path 7 formed on the board 2 to the optical module 3. The optical signal input to the optical module 3 is converted to an electric signal and supplied to the LSI 5 or the memory 6 via electrical interconnections 4. In reverse, an electric signal produced by the LSI 5 is supplied via the electrical interconnections 4 to the optical module 3 and converted to an optical signal. The optical signal propagates through the optical transmission path 7 formed on the board 2, the optical connectors 10-1 and 10-2), and the optical transmission path 7 on the backplane 1, and is supplied to a switch board (not shown).

To expand the system or carry out maintenance for the boards 2, the optical connector 10-1 is disconnected from the optical connector 10-2 to detach the boards from the backplane 1. The optical transmission path 7 on the board 2 is disconnected from the optical transmission path 7 on the backplane 1. After the system expansion or maintenance, the optical connector 10-1 is connected again to the connector 10-2 to connect the optical transmission path 7 on the board 2 to the optical transmission path 7 on the backplane 1. In this example, optical connector 10-1 is referred to as an "optical board connector 10-1", and the optical connector 10-2 is referred to as an "optical backplane connector 10-2" for the explanatory purpose. The optical board connector 10-1 and the optical backplane connector 10-2 may be referred to collectively as "optical connector 10" depending on the context.

Figure 2:
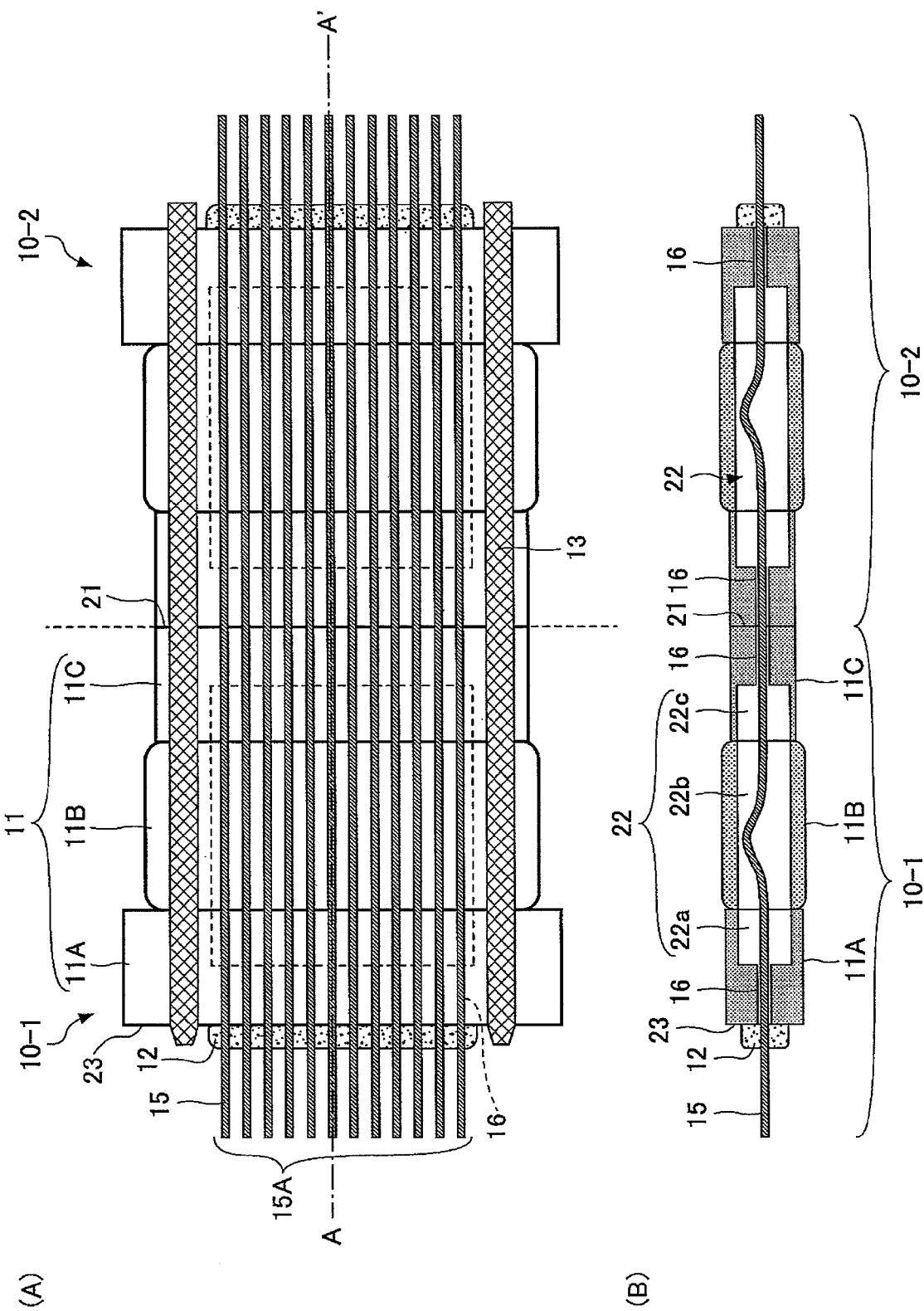
FIG. 2 is a diagram for explaining a basic concept and structure of the embodiments.

FIG. 2 illustrates the mutually connected optical board connector 10-1 and the optical backplane connector 10-2. The figure (A) is a top view illustrating the internal connection inside the optical connectors 10, and figure (B) is a cross-sectional view taken along the A-A' line of the figure (A). The optical connector 10 has guide holes 16 for guiding optical fibers 15, a space 22 communicating with the guide holes 16, and a deformable member 11B that allows at least a part of the optical fibers to bend in the space 22. In the example of FIG. 2, a deformable member 11B is an elastic member 11B formed as a part of a ferrule 11. The ferrule 11 is a fiber holder to hold the optical fibers 5 inside the optical connector 10. The ferrule 11 illustrated in FIG. 2 includes a base member 11A, a connection member 11C which is to be connected to a counterpart connector, and the intermediate member 11B positioned between the base member 11A and the connection member 11C. The intermediate member 11B is the deformable member. The ferrule members 11A, 11B and 11C have internal spaces 22a, 22b, and 22c, respectively, to define the space 22 as a whole.

The intermediate member 11B elastically deforms when the optical connector 10-1 is connected to the counterpart connector 10-2 to allow the optical fibers 15 to bend or warp in the internal space 22. The deformation of the intermediate member 11B may make use of self-elasticity as illustrated in FIG. 2, or alternatively, a portion of the ferrule 11 may be reduced in rigidity so as to produce flexibility as described below.

The optical fibers 15 are arranged parallel to each other at constant intervals to form a multi-core fiber array 15A. An arbitrary number of optical fibers may be used. For example, a 12-optical fiber array 15A may be used.

The optical connector 10 of the embodiment differs from the conventional structures and methods in the following point. In a typical method, optical fibers are cut altogether and incorporated in a ferrule, and then the cut ends of the optical fibers are polished until the cut ends align with the front end face of the ferrule, which face becomes the contact face to come into contact with the counterpart connector. In contrast, the optical connector 10 of the embodiment does not require the polishing process. The optical fibers 15 are cut altogether and incorporated in the ferrule 11 such that the cut ends of the optical fibers are retracted behind the front end face of the ferrule 11 with variations in the cutting length still contained. After the incorporation, the optical fiber array 15A is secured at the rear end face 23 of the base member 11A of the ferrule 11 by an adhesive 12. Even if the cut ends of the optical fibers 15 are uneven in the fiber guide holes 16, the optical fibers 15 go ahead toward the contact face 21 of the connection member 11C at a deformation stroke of the intermediate member 11B (e.g., elastic deformation) under contact pressure between the optical connector 10-1 and 10-2. The cut ends of the optical fibers 15 of the optical connector 10-1 can be precisely brought into contact with the optical fibers 15 of the optical connector 10-2. Deformation of the intermediate member 11B may cause a part or all of the optical fibers 15 to bend during the connection process. However, such bending can be accommodated in the space 22.

The structures of the optical connector of the embodiments will be described in more detail below based upon actual examples.

First Embodiment

Figure 3:
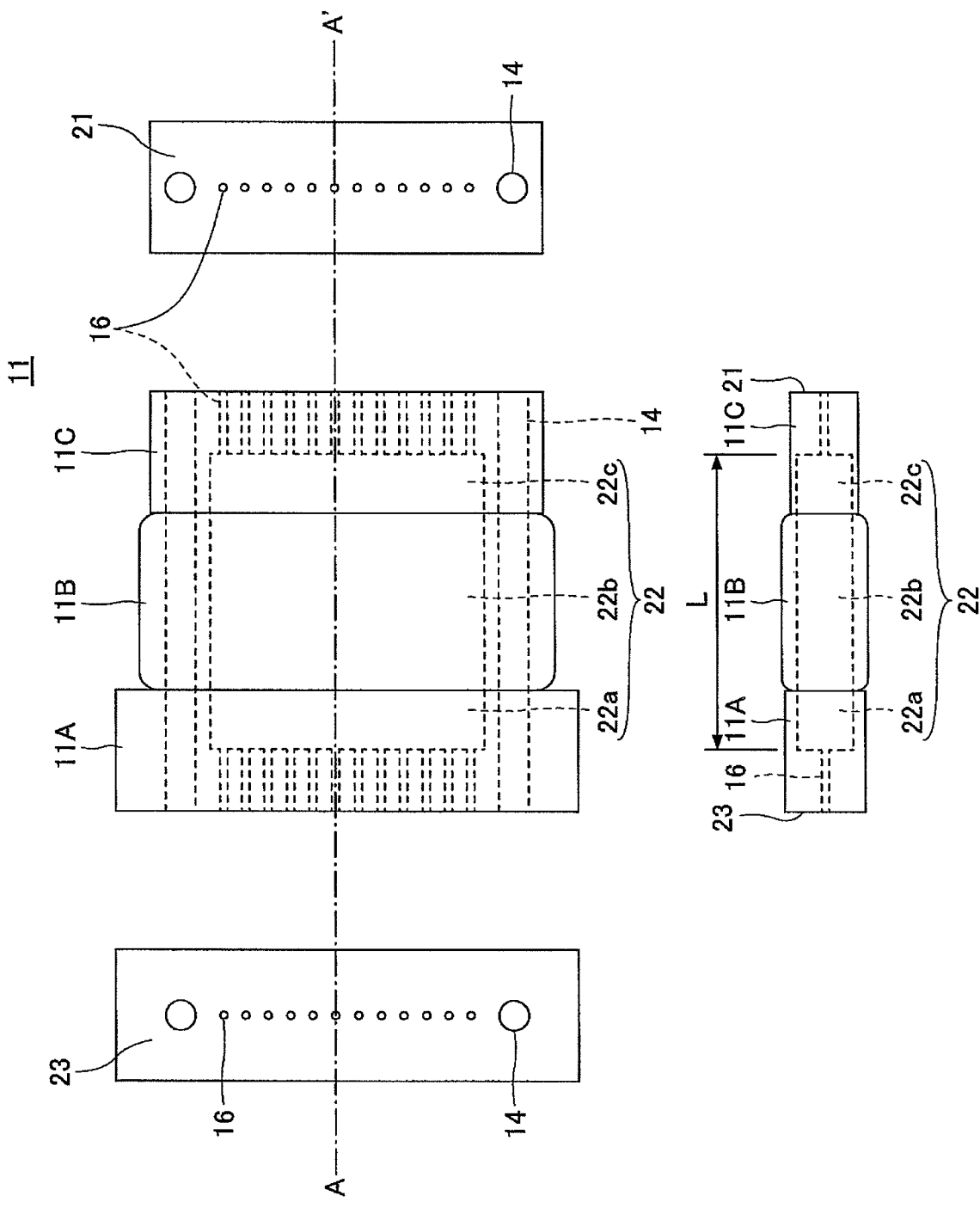
FIG. 3 illustrates in four orthogonal views a ferrule used in an optical connector according to the first embodiment.

FIG. 3 illustrates in four orthogonal views of a ferrule 11 used in an optical connector 10 according to the first embodiment. Light signals propagate in the direction along the A-A' line. A top view of the ferrule 11 is depicted in the center, and a rear view representing the rear end face 23 and a front view representing the front end face (contact face) 21 are arranged on the left-hand side and the right-hand side of the top view, respectively, along the A-A' line. A side view of the ferrule 11 is depicted under the top view.

The ferrule 11 includes a base member 11A, an intermediate member 11B, and a connection member 11C, which members are coupled to each other via an adhesive. Fiber guide holes 16 are formed in the base member 11A and the connection member 11C. The intermediate member 11B has a space 22b inside it. In the arrangement of FIG. 3, the base member 11A and the connection member 11C also have internal spaces 22a and 22c, respectively, and the internal spaces 22a and 22c communicate with the associated fiber guide holes 16. The optical connector of the embodiment operates correctly as long as an appropriate space for allowing the optical fibers to deform or bend during optical connection is provided. Accordingly, the space 22 may be provided only in the intermediate member 11B and/or the connection member 11C. The number of the fiber guide holes 16 is not limited to this example. For example, twelve (12 core fiber optic cable), twenty four (24 core fiber optic cable), forty eight (48 core fiber optic cable), or more may be employed. Guide pin holes 14 are formed throughout the base member 11A, the intermediate member 11B and the connection member 11C. The standard of the guide pins 14 complies with, for example, the standard of an MT ferrule.

FIG. 4A illustrates in four orthogonal views the base member 11A of the ferrule 11 illustrated in FIG. 3. Light signals propagate in the direction along the A-A' line. A top view of the base member 11A is in the center of the figure, and a rear view representing the rear end face 23 and a front view representing an interface coupled with the intermediate member 11B are arranged on the left-hand side and the right-hand side of the top view, respectively. A side view is arranged under the top view. The base member 11A may be fabricated by injection molding using a PPS resin, an epoxy resin or the like. The dimensional accuracy of the fiber guide holes 16 complies with the standard of an MT ferrule. Optical fibers 15 are, for example, graded index (GI) 50/80 fibers with the core diameter of 50 µm and the outer cladding diameter of 80 µm. In this case, the diameter of the fiber guide hole 15 is, for example, 81 µm with ±1 µm tolerance. The size of the base member 11A along the A-A' line is, for example, 4 mm, the length of the fiber guide hole 16 communicating with the internal space 22a is 2 mm, and the height h1 of the base member 11A is 3 mm.

Figure 4B:
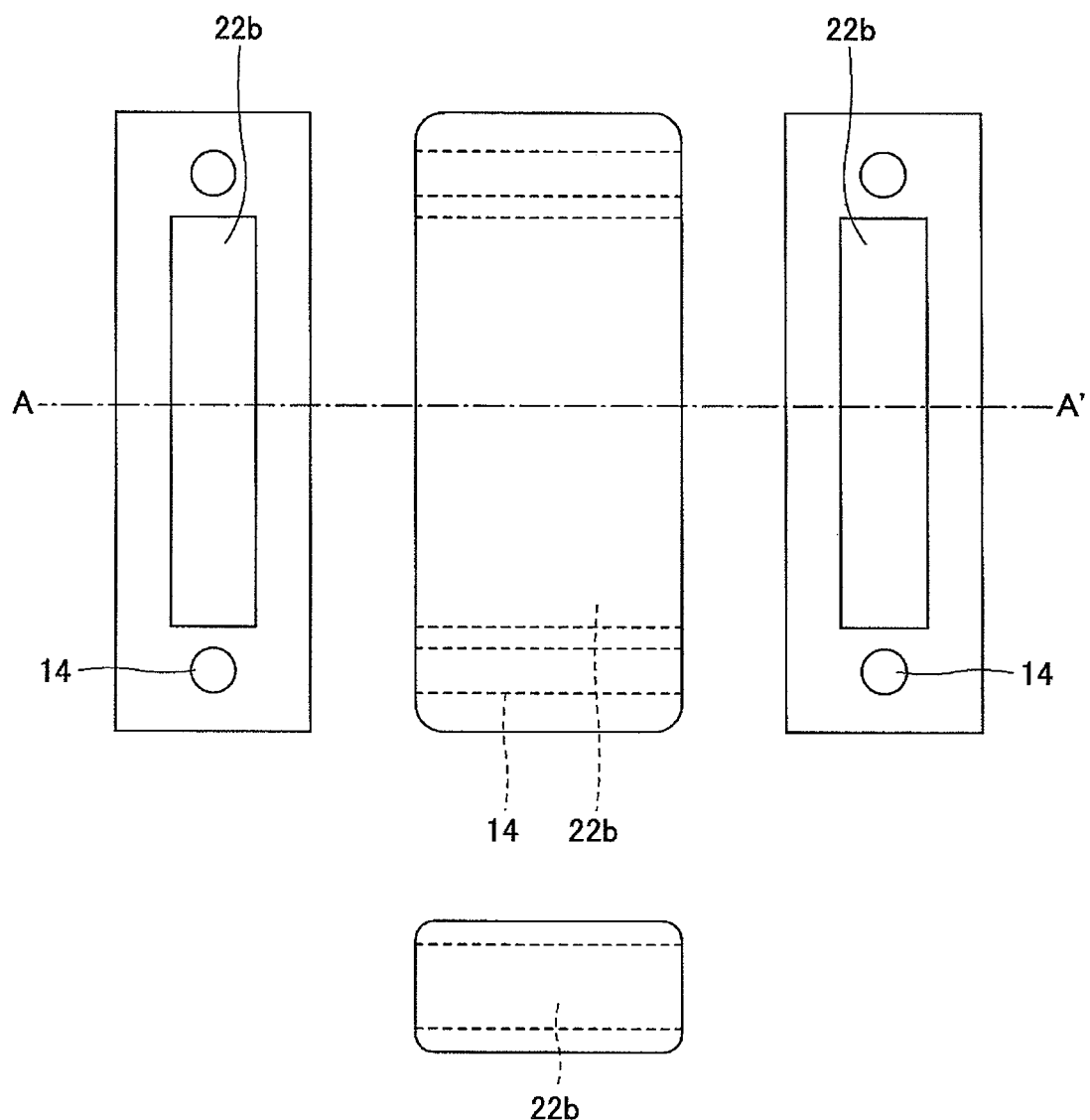
FIG. 4B illustrates in four orthogonal views a ferrule member B constituting a part of the ferrule of FIG. 3.

FIG. 4B illustrates in four orthogonal views the intermediate member 11B of the ferrule 11 illustrated in FIG. 3. Light signals propagate in the direction along the A-A' line. A top view of the intermediate member 11B is in the center of the figure, and a rear view representing the interface coupled with the base member 11A and a front view representing an interface coupled with the connection member 11C are arranged on the left-hand side and the right-hand side of the top view, respectively. A side view of the intermediate member 11B is arranged under the top view. The intermediate member 11B is made of an elastic material such as a neoprene rubber and has a rectangular space 22b. The intermediate member 11B may be fabricated by, for example, metal injection molding. The dimensions and the shape of the intermediate member 11B are arbitrary as long as it can accommodate bending or warping of the optical fibers. For example, the length in the direction of light propagation (along the A-A' line) is 2 mm.

FIG. 4C illustrates in four orthogonal views the connection member 11C of the ferrule 11 illustrated in FIG. 3. Light signals propagate in the direction along the A-A' line. A top view of the connection member 11C is in the center of the figure, and a rear view representing the interface coupled with the intermediate member 11B and a front view representing the contact face 21 are arranged on the left-hand side and the right-hand side of the top view, respectively. A side view of the connection member 11C is arranged under the top view. The connection member 11C may be made of the same material and the same method as the base member 11A. The base member 11A may be used as the connection member 11C to save the fabrication cost. The length of the connection member 11C in the direction of light propagation is, for example, 4 mm. The length of the fiber guide holes 16 communicating with the internal space 22c is 2 mm, and the height h2 of the connection member 11C is 2.5 mm. The width in the direction perpendicular to the light propagation is any suitable size corresponding to the optical fiber array 15A. The width is, for example, 6.4 mm.

FIG. 5A through FIG. 5D illustrate how the optical connector 10 is connected to a counterpart connector (not illustrated in these figures). FIG. 5A illustrates initial state of the optical fibers 15 held in the ferrule 11 before the optical connector 10 comes into optical connection with a counterpart connector. FIG. 5A (A) is a transparent top view of the optical connector 10. FIG. 5A (B) and FIG. 5A (C) are cross-sectional views taken along the A-A' line and the B-B' line of FIG. 5A (A), respectively. For the purpose of clarification of the drawings, the internal space 22 is whitened in FIG. 5A (A), FIG. 5B (A), FIG. 5C (A) and FIG. 5D (A).

The optical fiber array 15A includes twelve optical fibers 15, which array may be referred to as a 12 core tape fiber. After removal of a portion of the tape (not depicted), the optical fiber array 15A is cut at a time using a fiber cutter to reduce the assembling cost. The optical fibers 15 of the optical fiber array 15A are then inserted in the ferrule 11 from the fiber guide holes 16 of the base member 11A and guided to the contact face 21 of the connection member 11C. The optical fiber array 15A is adhered to the end face 23 of the base member 11A by applying, for example, an epoxy resin while providing a jig to the end face 23 of the base member 11A and pressing the tape fiber to the jig with a gentle force. An arbitrary tape fiber may be incorporated as needed depending on the number of optical fibers used therein. If the number of optical fibers is 24 or more, the adhesion process may be performed after all the fibers have been inserted.

As depicted in FIG. 5A (A), the lengths of the optical fibers 15 of the optical fiber array 15A are uneven because the length variations in the fiber cutting still remain. The optical fibers 15 are retracted in the fiber guide holes 16 behind the contact face 21 of the connection member 11C of the ferrule 11. The optical fiber 15-1 along the A-A' line is shorter than the optical fiber 15-2 along the B-B' line, and it stays more backward in the fiber guide hole 16. No deformation occurs in the intermediate member 11B of the ferrule 11, and the length L1 of the intermediate member 11B in the light propagation direction is an initial length. Optical fibers 15 extend straight in the internal space 22 of the ferrule 11 without bending or warping.

In FIG. 5B, connection with a counterpart connector (not shown) begins. The connection member 11C comes into physical contact with the ferrule (not shown) of the counterpart connector. The physical contact produces a pressing force toward the intermediate member 11B, and accordingly, the intermediate member 11B starts deforming in the light propagation direction. Along with the deformation of the intermediate member 11B, the connection member 11C is pushed to the left in the figure (toward the base member 11A). The optical fibers 15 start moving relatively in the fiber guide holes 16 toward the contact face 21 of the connection member 11C.

The optical fiber 15-2 having the longest post-cutting projection among the optical fibers 15 reaches the contact face 21 when the length of the intermediate member 11B along the light propagation axis becomes L2 (L2<L1), as illustrated in the cross-section B-B' in FIG. 5B (C). At this time, the optical fiber 15-1 having a shorter post-cutting projection is still in the fiber guide hole 16 behind the contact face 21, as illustrated in FIG. 5B (B).

Then in FIG. 5C, the optical connector 10 is further pressed against the counterpart connector (not shown). The intermediate member 11B of the ferrule 11 further deforms and the length of the intermediate member 11B along the light propagation axis becomes L3 (L3<L2<L1). Along with the deformation of the intermediate member 11B, the connection member 11C is pushed toward the base member 11A. Consequently, the optical fiber 15-2 having the longest post-cutting projection starts buckling in the space 22 inside the ferrule 11, as illustrated in FIG. 5C (C). On the other hand, the optical fiber 15-1 having a shorter post-cutting projection goes on moving relatively in the fiber guide hole 16 toward the contact face 21. Some of the other optical fibers 15 also start buckling depending on the lengths of the post-cutting projection.

Finally, as illustrated in FIG. 5D, the intermediate member 11B has deformed in the light propagation direction up to length L4 (L4<L3<L2<L1), and optical connection has been completed. The optical fibers 15 keep on receiving a pressure under the pressing contact even after all the channels have been connected (FIG. 5D (A)). The optical fiber 11-1 with the shortest post-cutting projection slightly bends in the space 22 inside the ferrule 11. In this state, all of the optical fibers 15 are in the physical contact (PC) connection with the counterpart connector in a reliable manner.

Figure 6:
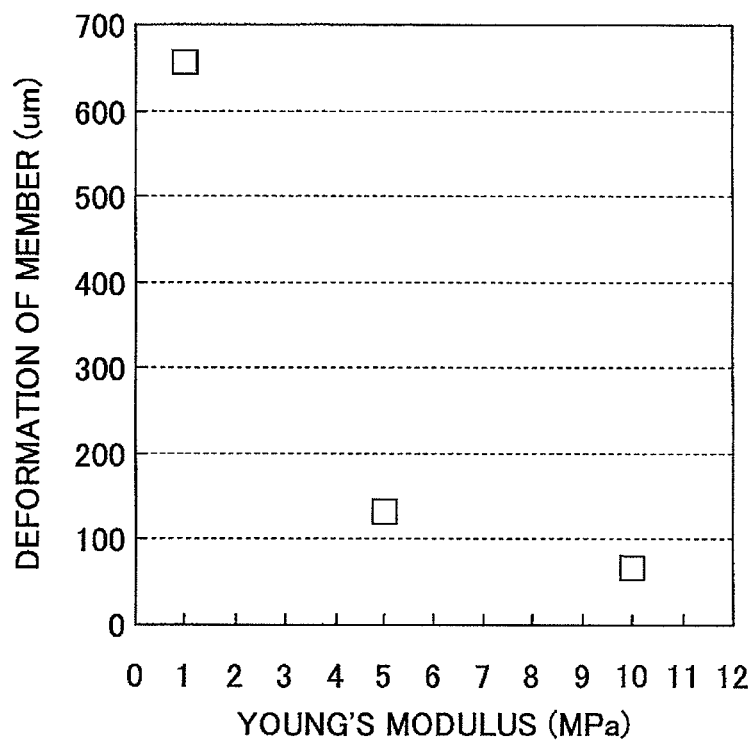
FIG. 6 is a diagram illustrating deformation of a ferrule member as a function of Young's modulus.

FIG. 6 is a diagram illustrating deformation (μm) of intermediate member 11C of the ferrule 11 as a function of Young's modulus (MPa) of neoprene rubber used for the intermediate member 11C in the first embodiment. The numerical values in the graph are calculated by a finite element approach. If the Young's modulus of the neoprene rubber is 1.58 MPa, the deformation of the intermediation member 11B along the light propagation axis is 600 μm. If the Young's modulus of the neoprene rubber is 5 MPa, the deformation of the intermediation member 11B along the light propagation axis is 150 μm. With the Young's modulus of 10 MPa, the deformation of the intermediation member 11B is at or above 80 μm.

The length of the cut ends of the optical fibers 15 varies in the range of 10 μm to several tens micrometers. Anticipating the length variation of 100 μm taking the margin from the contact face 21 of the ferrule into account, it is preferred to select a material with the Young's modulus at or below 10 MPa for the intermediate member 11B.

Using the above-described ferrule 11, physical contact (PC) connection is achieved in all the optical fibers 15 in the multi-fiber configuration, and the influence of the variation in the post-cutting length of the fibers 15 can be nullified. High-precision cutting techniques or the polishing of the cut ends near the end face of the ferrule can be omitted, and the fabrication cost can be reduced. Because the ends of the optical fibers 15 are held in the ferrule 11, the reliability of the optical connector 10 is guaranteed for the long term. Since optical connection between optical connectors 10 starts from the contact face 21 of the ferrule 11, the ends of the optical fibers 15 can be protected.

Optical fibers 15 may be fused silica fibers generally used in the telecommunication field, plastic optical fibers (POF), hard polymer-clad fibers (H-PCF), or any other suitable fibers. A low-rigidity fiber, such as POF, can enhance the effect and the advantage of the first embodiment.

Figure 7:
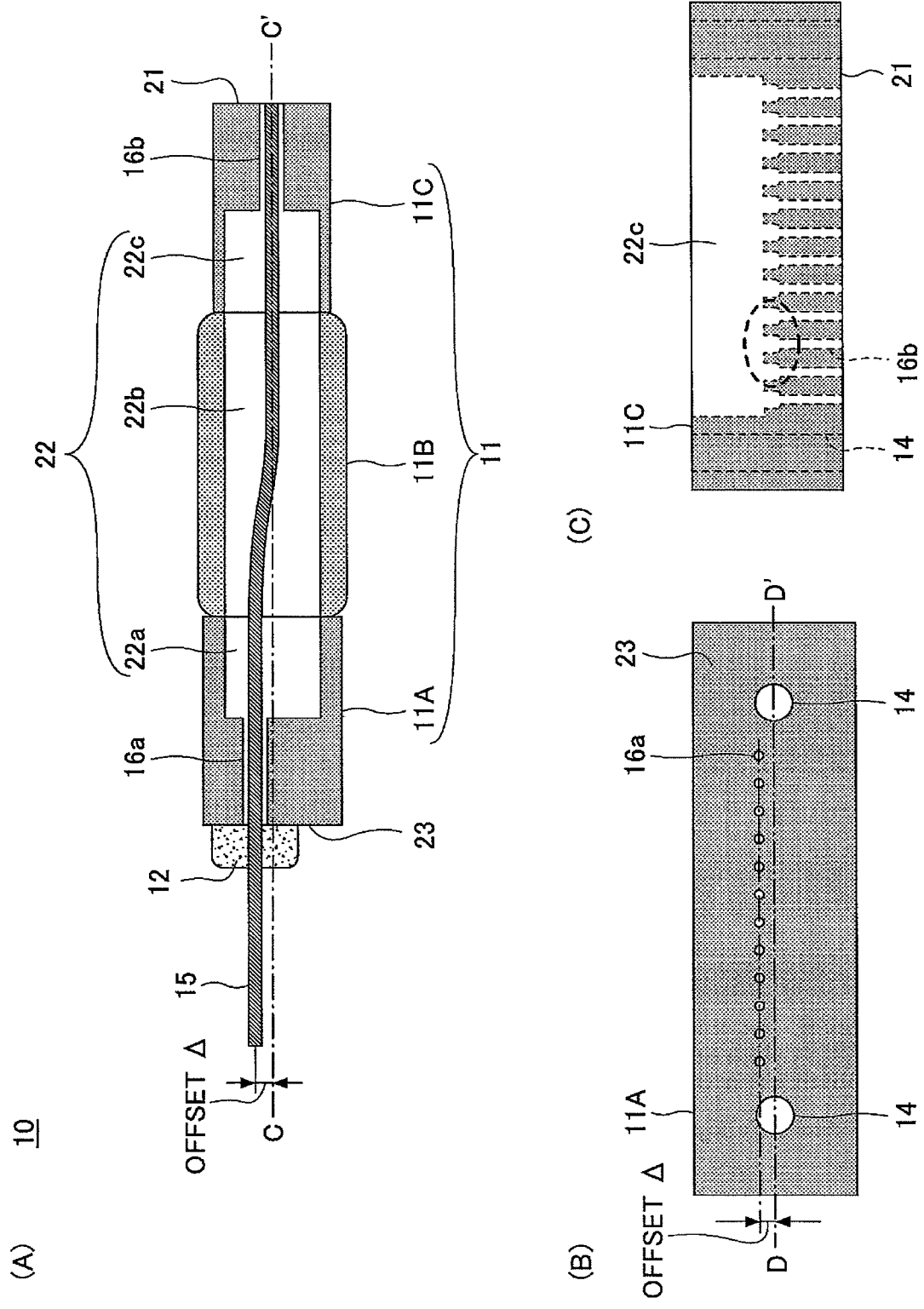
FIG. 7 illustrates an offset structure for incorporating optical fibers in the optical connector.

FIG. 7 illustrates an example of insertion of the optical fibers 15 in the optical connector 10 of the first embodiment. As illustrated in FIG. 7 (A), initial bending is provided to the optical fibers 15 at the base (or inserting port) of the ferrule 11 when the optical fibers 15 are inserted in the ferrule 11. This arrangement allows an array of optical fibers 15 to warp in substantially the same direction without touching. To be more precise, the array of optical fibers 15 is inserted in the base member 11A of the ferrule 11 at a position offset from a plane which contains the light propagation center axis (along the C-C' line) and is parallel to the array direction of the optical fibers 15. By shifting the fiber array inserting position with respect to the connection-side fiber aligning position of the ferrule 11, the bend absorbing effect is more enhanced. When the optical connector is connected to the counterpart connector, the optical fibers 15 tend to bend in the same direction, and accordingly, the quantity of bending of each optical fiber 15 can be increased. In FIG. 7 (A), the optical fiber inserting position of the base member 11A is shifted in the height or thickness direction (upward in the figure) of the ferrule 11. The optical fibers 15 bend or warp in a sine curve in the vertical direction of the ferrule 11, while avoiding adjacent optical fibers touching each other in the space 22.

To give an initial bend to the optical fibers 15, the position of the line of fiber guide holes 16a is offset in the height (or thickness) direction of the ferrule 11 from the straight line (D-D' line) connecting the guide pin holes 14 at the rear end face 23 of the base member 11A of the ferrule 11, as illustrated in FIG. 7 (B). The D-D' line includes the light propagation center axis and is parallel to the array direction of the optical fibers 15. The base-side array of the fiber guide holes 16a and the connection-side array of the fiber guide holes 16b are relatively offset from each other.

In the example of FIG. 7, the offset Δ is set to 300 μm. Under the load (ferrule pressing force) of 1 kgf/cm², the deformation of the intermediate member 11b or the relative displacement of the optical fiber 15 in the light propagation direction is 32 μm. The variation in the post-cutting length of the optical fibers 15 is permitted within this range. The amount of offset Δ can be appropriately selected depending on the type of optical fibers 15, variation in the post-cutting length of the fibers, the ferrule pressing force, etc.

FIG. 7 (C) illustrates an example of the structure of the connection member 11C to facilitate guiding of the optical fibers 15, which have been inserted in the space 22 of the ferrule 11, into the fiber guide holes 16b. In FIG. 7 (C), the internal space 22 and the fiber guide holes 16b are whitened for the purpose of clarification. The end portion of the fiber guide holes 16b that communicates with the space 22c is U-shaped in a cross-sectional view taken along the array of the fiber guide holes 16b such that the optical fibers 15 are easily introduced into the fiber guide holes 16b. The cross-sectional shape of the end portion of the fiber guide hole 16b may be V-shape, half-round, or any other shape suitable for introducing the optical fiber 15 into the corresponding fiber guide hole 16b.

FIG. 8 illustrates a process of inserting optical fibers 15 in the ferrule 11 with the offset structure. As illustrated in FIG. 8 (A), the ferrule members 11A, 11B and 11C correctly positioned by the guide pin 13 and the guide pin hole 14 (see FIG. 2 and FIG. 3) are bonded to each other. The fiber guide hole 16b of the connection member 11C extends along the center axis (C-C' line) of the ferrule 11 in the light propagation direction. On the other hand, a line of fiber guide holes 16a of the base member 11A is positioned offset from the center axis in the height or thickness direction of the ferrule 11 (upward in the page). The fiber guide holes 16a of the base member 11A may be gently sloped toward the center axis (along the C-C' line) forming a passage from the opening of the rear end face 23 to the internal space 22.

Then, as illustrated in FIG. 8 (B), each of the optical fibers 15 of a tape fiber (i.e., an optical fiber array) is inserted from the associated fiber guide hole 16a of the base member 11A. The optical fiber 15 passes through the fiber guide hole 16a and the space 22 inside the ferrule 11, and gets into the fiber guide hole 16b of the connection member 11C. During the insertion, the leading ends of the optical fibers 15 are not aligned as has been explained in conjunction with FIG. 5A.

Then, as illustrated in FIG. 8 (C), the optical fiber 15 is bonded to the rear end face 23 of the base member 11A, and the fiber incorporation process is completed.

Figure 9A:
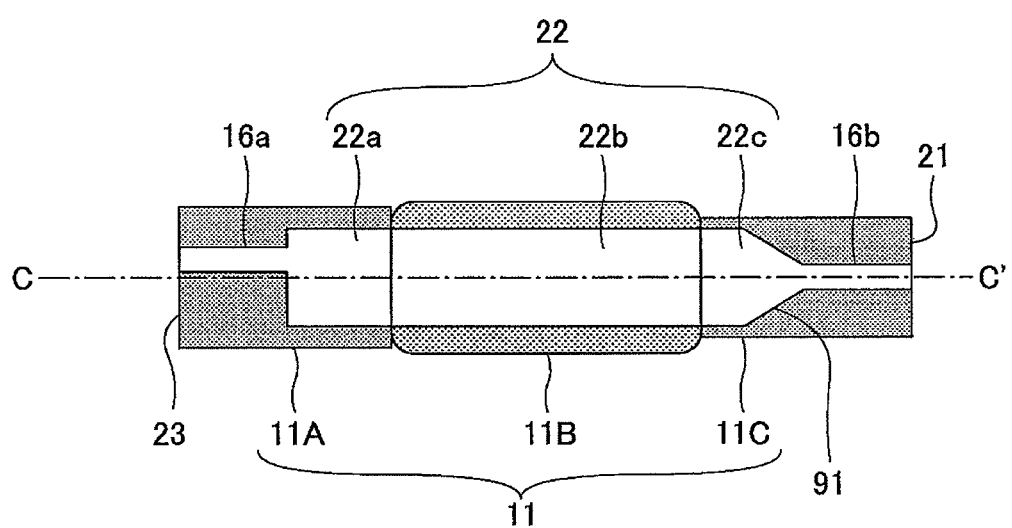
FIG. 9A illustrates a modification 1 for incorporating optical fibers in the optical connector.
Figure 9B:
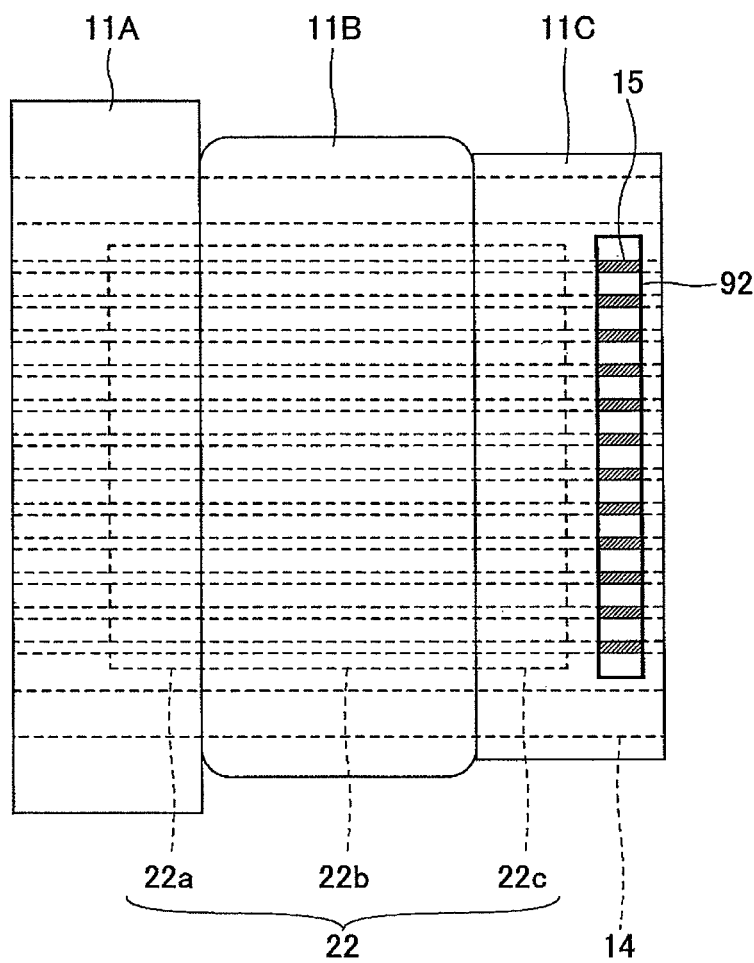
FIG. 9B illustrates a modification 2 for incorporating optical fibers in the optical connector.

FIG. 9A and FIG. 9B illustrate modifications of the offset structure of FIG. 7 to facilitate the insertion of the optical fibers 15. In FIG. 9A, the connection member 11C is shaped such that the internal space 22c has a tapered guide structure 91. The tapered guide structure 91 has a V-shaped cross-section in the height direction of the ferrule 11. This guide structure may be combined with the U-shaped fiber guide structure provided for each channel (i.e., optical fiber 15) in the horizontal direction illustrated in FIG. 7 (C). In FIG. 9B, a window 92 is formed in the connection member 11C to check the insertion of the optical fibers 15. This structure allows the fiber insertion state to be checked visibly.

Figure 10:
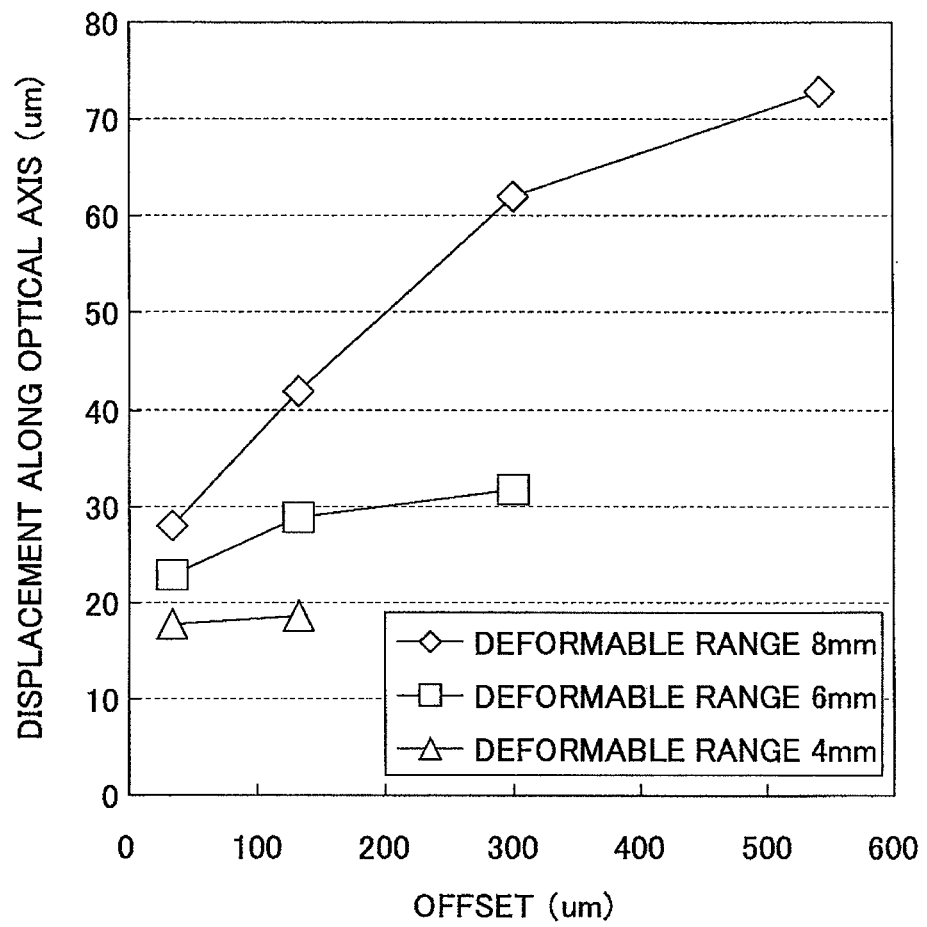
FIG. 10 is a diagram representing an advantageous effect of the offset structure of FIG. 7.

FIG. 10 is a diagram illustrating the effect of the offset structure of FIG. 7. The data are obtained using an optical fiber 15 with an outer diameter of 80 μm under application of the same load. The graph indicates how the offset affects the displacement of the optical fiber 15. Numerical calculation is made by a finite element approach. Measurement is made of three different deformable ranges. Each deformable range corresponds to a length of the internal space 22 of the ferrule 11 along the light propagation axis for absorbing the bend of the optical fiber 15. In the same deformable range, as the offset increases, the displacement (μm) of the optical fiber increases. When the length of the internal space 22 along the light propagation axis (i.e., the deformable range) is 6 mm and the offset is 300 μm, and if the load is 1 kgf/cm², the displacement of the optical fiber 15 is about 32 μm, as has been described above.

By providing an offset to the fiber inserting position with respect to the fiber connecting position, the displacement or deformation of the optical fiber can be increased. Consequently, the margin for length variation in the cut end of the optical fibers can be increased.

Second Embodiment

Figure 11:
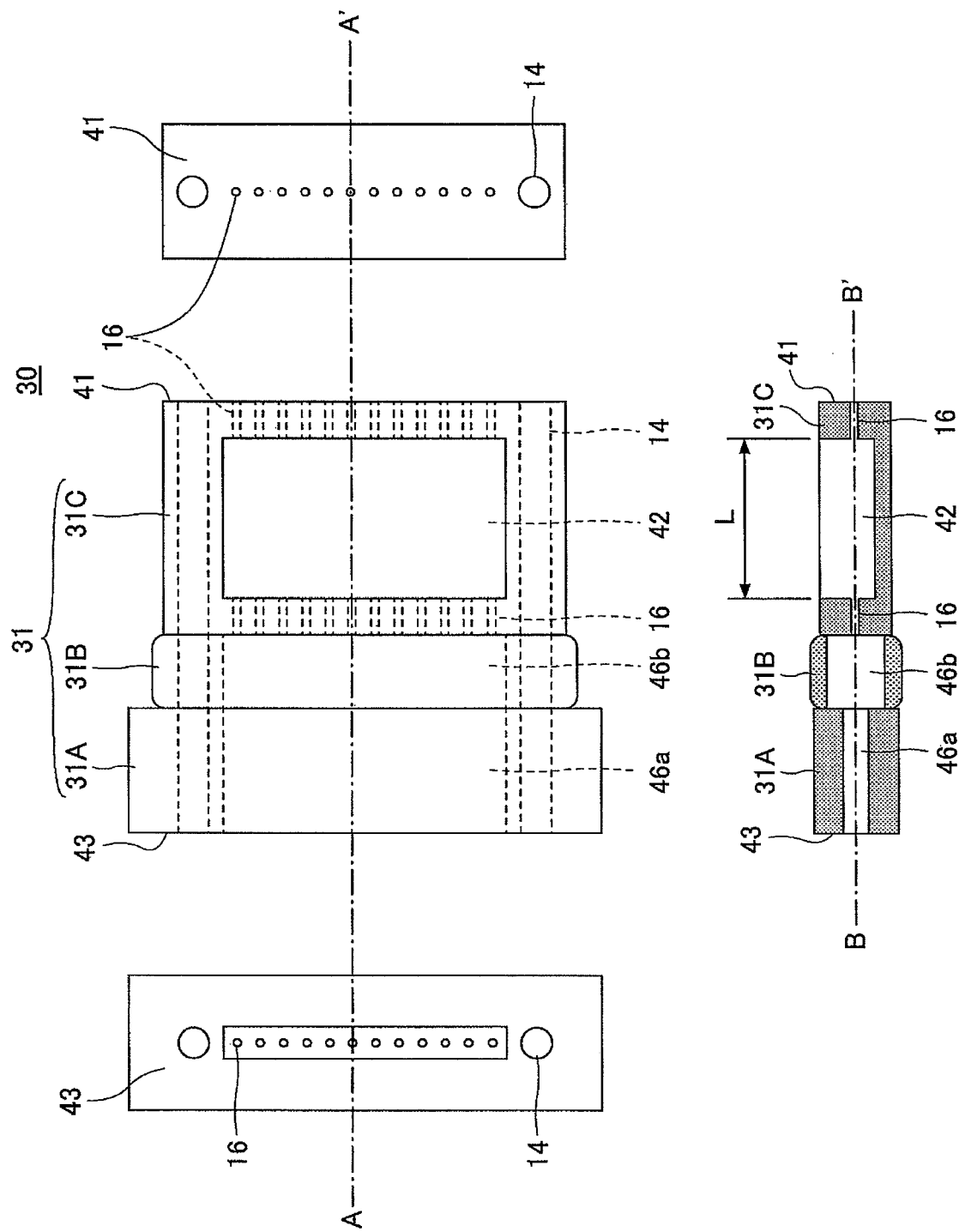
FIG. 11 illustrates in four orthogonal views a ferrule used in an optical connector according to the second embodiment.

FIG. 11 illustrates in four orthogonal views an optical connector 30 according to the second embodiment. In the second embodiment, a ferrule 31 includes a base member 31A, an intermediate member 31B, and a connection member 31C as in the first embodiment, but a space 42 for allowing optical fibers having been inserted in the ferrule 31 to bend is provided only in the connection member 31C. The space 42 to accommodate bending of optical fibers is a rectangular space with an open top. The front side and the rear side of the space 42 are formed fiber guide holes 16 extending in the light propagation direction (along the A-A' line) in the connection member 31C.

The fiber guide hole 16 formed in the connection member 31C has a diameter of, for example, 82 μm with a tolerance of ±1 μm when using an optical fiber with a diameter of 80 μm. In the example of FIG. 11, the length of the connection member 31C along the A-A' line is 8 mm, and the length of the space 42 for accommodating fiber bending is 6 mm along the A-A' line. The width of the contact face 41 of the connection member 31C perpendicular to the A-A' line is arbitrarily selected in accordance with the optical fiber array used in the optical connector 30, and it is set to, for example, 7 mm.

The intermediate member 31B is made of a material deformable under contact pressure between the ferrule 31 and a counterpart connector, as in the first embodiment. For example, an elastic material such as neoprene rubber may be used. The length of the intermediate member 31B in the light propagation direction is, for example, 2 mm. The base member 31A is used to securely hold the optical fibers 15, and accordingly an arbitrary shape may be employed for the base member 31A in the second embodiment. A space 46a and a space 46b are formed in the base member 31A and the intermediate member 31B, respectively, to accommodate the optical fiber array. The base member 31A, the intermediate member 31B and the connection member 31C of the ferrule 31 are correctly positioned using guide pin holes 14 and guide pins (see FIG. 2), and coupled to each other.

The optical connector 30 of the second embodiment can achieve the same effect as the first embodiment. Optical fiber array 15A (see FIG. 5A) is incorporated in the ferrule 31 with variation in the length of the cut ends of the optical fibers contained. When connected to a counterpart connector, the intermediate member 31B which serves as an elastic member deforms to allow all the optical fibers 15 to relatively move forward to the contact face 41. Bending of the optical fibers due to the deformation of the intermediate member 31B can be accommodated in the internal space 42, and the optical fiber array of the optical connector can be connected to the fiber array of the counterpart connector in a reliable manner.

The offset structure illustrated in FIG. 7 may be employed in the second embodiment. In this case, the connection member 31C may be structured to incorporate the structure for promoting insertion of the optical fibers illustrated in FIG. 9A or FIG. 9B. By combining the offset structure with the second embodiment, the amount of bending of the optical fibers can be increased, while avoiding adjacent optical fibers touching each other.

Third Embodiment

Figure 12:
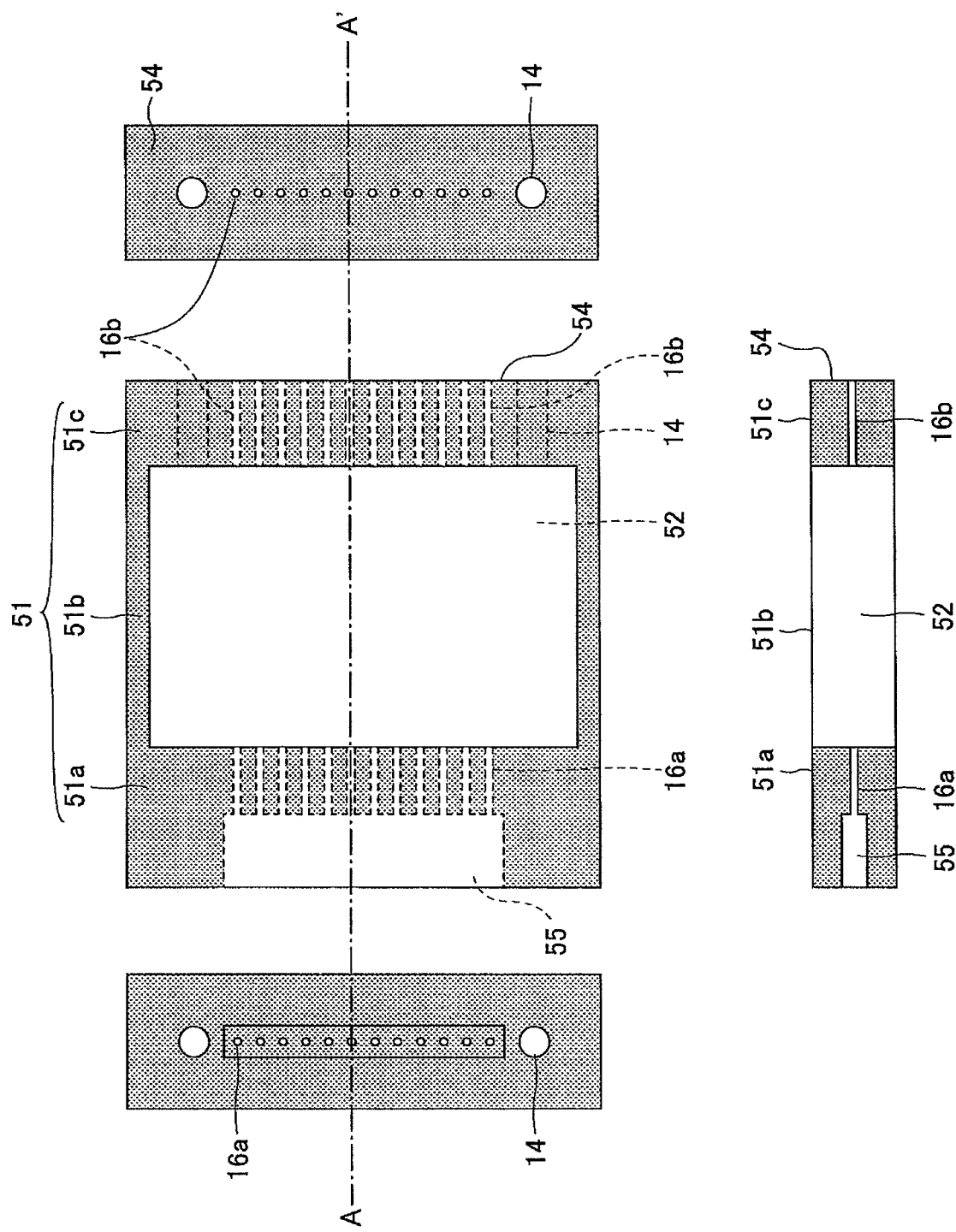
FIG. 12 illustrates in four orthogonal views a ferrule used in an optical connector according to the third embodiment.
Figure 13:
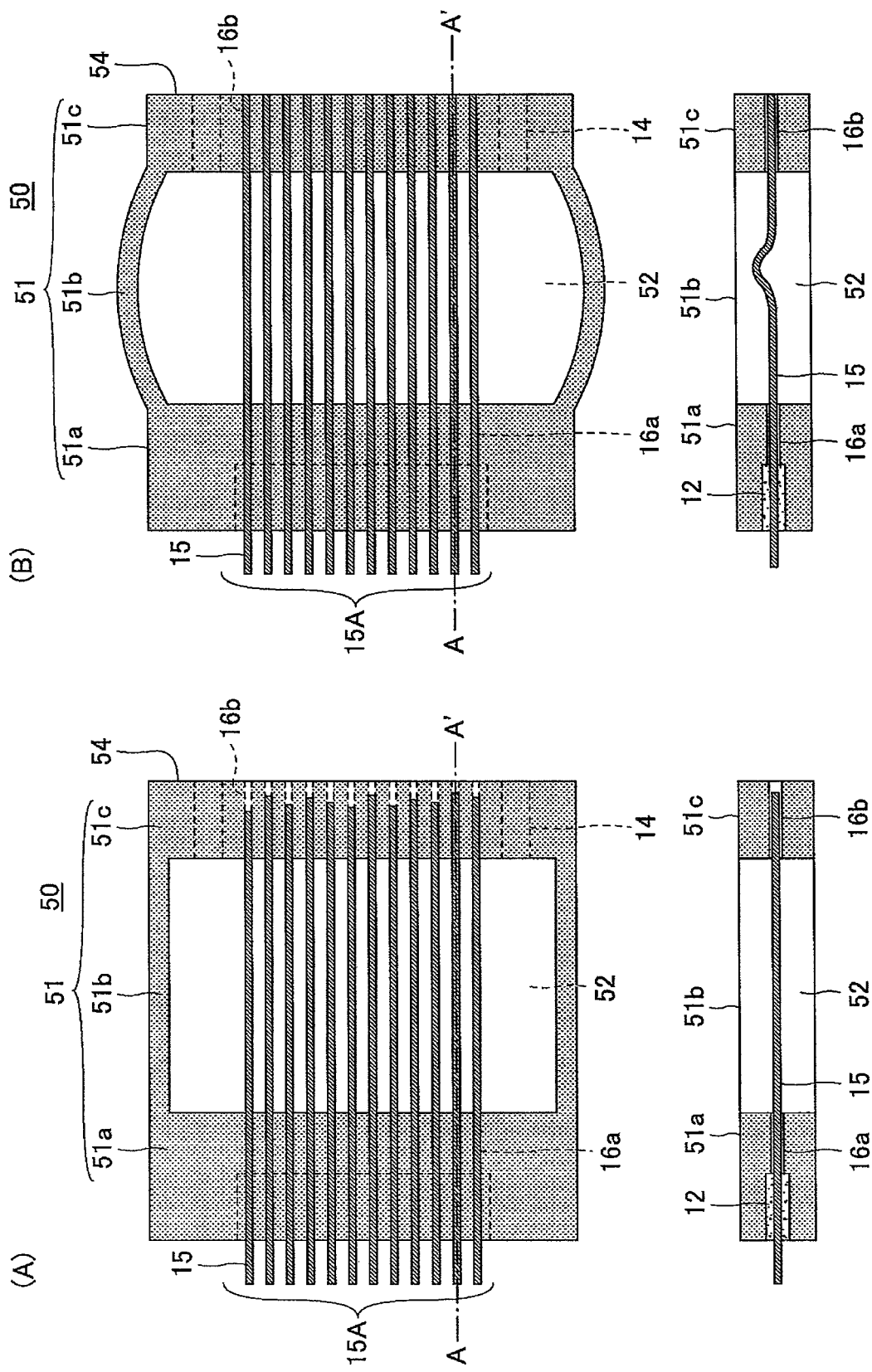
FIG. 13 illustrates how the ferrule of FIG. 12 deforms when the optical connector is fit into a counterpart connector.

FIG. 12 and FIG. 13 illustrate an optical connector 50 according to the third embodiment. As illustrated in FIG. 12, a ferrule 51 of the optical connector 50 is formed of a single member with flexibility. A part of the ferrule 51 is made thin to reduce the rigidity at that part and provide partial flexibility. The ferrule 51 includes a base wall 51a, a connection wall 51c, and side walls 51b extending between the base wall 51a and the connection wall 51c. The base wall 51a has fiber guide holes 16a for receiving optical fibers 15 (see FIG. 13). The connection wall 51c has fiber guide holes 16b for holding the optical fibers 15 at the contact face 54 that comes into contact with a counterpart connector. The thickness of the side walls 51b is sufficiently reduced compared with the rest of the parts. The side walls 51b are designed so as to warp or bend when the contact face 54 is pressed against the counterpart connector.

The base wall 51a, the side walls 51b and the connection wall 51d define a space 52 for accommodating bending of optical fibers. The top and the bottom of the ferrule 51 are open in the example of FIG. 12. The length of the ferrule 51 in the light propagation direction (along the A-A' line) is, for example, 8 mm in the disconnected state. The length of the space 52 along the A-A' line is, for example, 4 mm, and the thickness of the side walls 51b is, for example, 0.7 mm. The connection wall 51c is provided with guide pin holes 14 on either side of the array of the fiber guide holes 16b. The base wall 51a is provided with the fiber guide holes 16a and a space 55 for holding the optical fiber array (not shown in FIG. 12). A fiber guide structure illustrated in FIG. 9A or FIG. 9B may be provided to the space 55. After an optical fiber array is inserted in the ferrule 51, the space 55 is filled with an adhesive to bond the optical fiber array. The ferrule 51 may be fabricated by injection molding using an arbitrary flexible material.

FIG. 13 illustrates how the optical connector 50 is connected to a counterpart connector (not shown). FIG. 13 (A) illustrates a disconnected state of the optical connector 50. Optical fibers 15 form an optical fiber array 15A. The optical fibers 15 are inserted in the ferrule 51 through the fiber guide holes 16a and the fiber bend absorbing space 52 and guided into the fiber guide holes 16b toward the contact face 54. The leading ends of the optical fibers are not aligned due to length variation in the cut end of the optical fibers. All the optical fibers 15 are retracted behind the contact face 54 in the fiber guide holes 16b.

The optical fiber array 15A is securely held by the base wall 51a of the ferrule 51 by an adhesive 12. In this state, there is no bend occurring either in the ferrule 51 or the optical fibers 15.

FIG. 13 (B) illustrates a connected state of the optical connector 50. The contact face 54 is pressed against the ferrule of the counterpart connector (not shown) and receives a pressing force under the physical contact. The side walls 51b of the ferrule 51 bend and the length of the space 52 decrease in the light propagation direction (along the A-A' line). The optical fibers 15 move forward relatively in the fiber guide holes 16b to the position aligning the contact face 54. When reaching the contact face 54, the optical fibers 15 come into contact with the counterpart connector. Since the optical fibers 15 are bonded by the adhesive 12 at the base, the optical fibers 15 start bending in the space 52 as an additional pressing force is applied.

The offset structure illustrated in FIG. 7 may be combined with the optical connector 50 of the third embodiment to allow the optical fibers 15 to bend in the same direction in the space 52.

The above-described configuration of the third embodiment can achieve the same effect as the first and second embodiment. Besides, because the ferrule 41 can be fabricated by injection molding using a single die, the fabrication cost is reduced.

Fourth Embodiment

Figure 14:
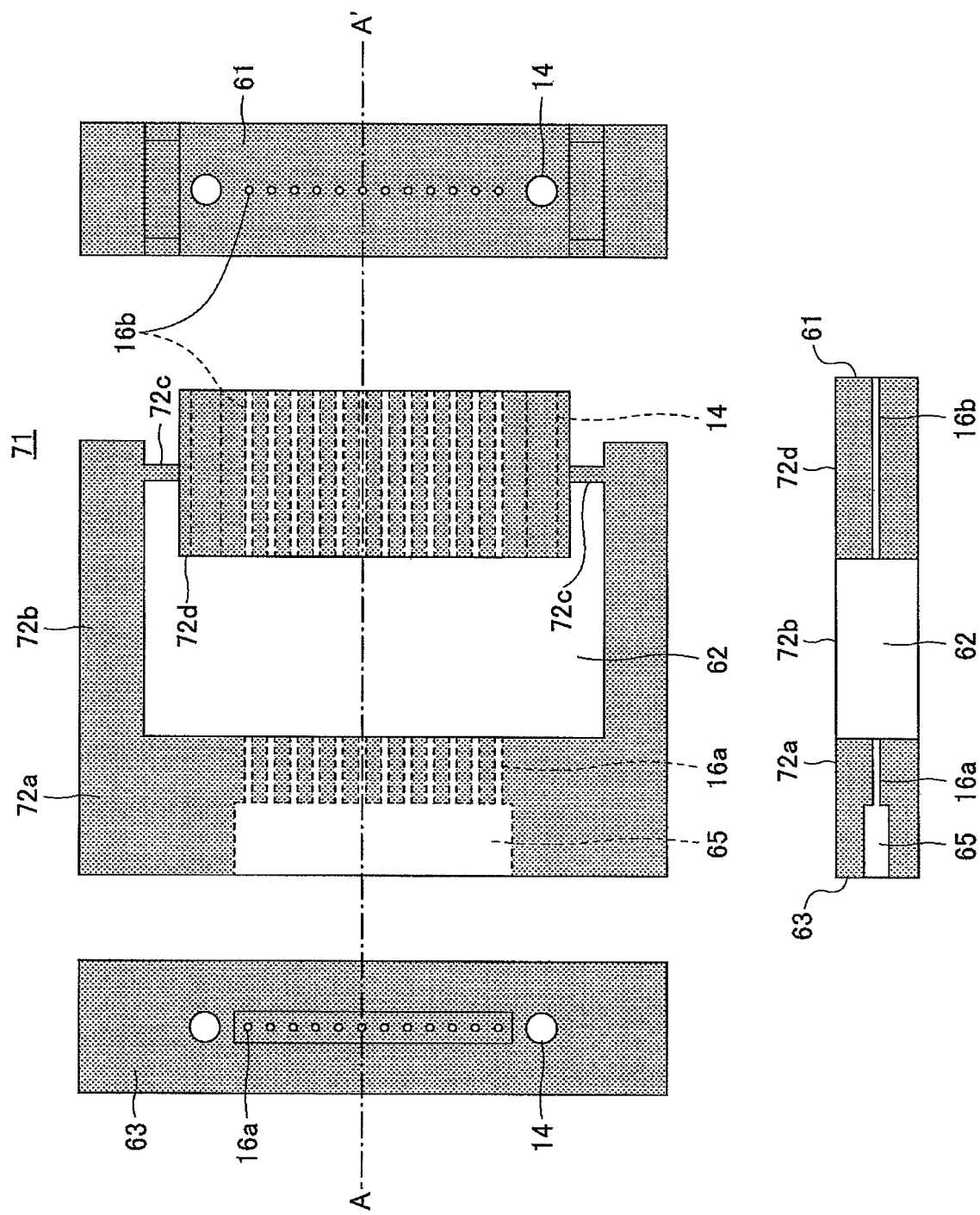
FIG. 14 illustrates in four orthogonal views a ferrule used in an optical connector according to the fourth embodiment.
Figure 15:
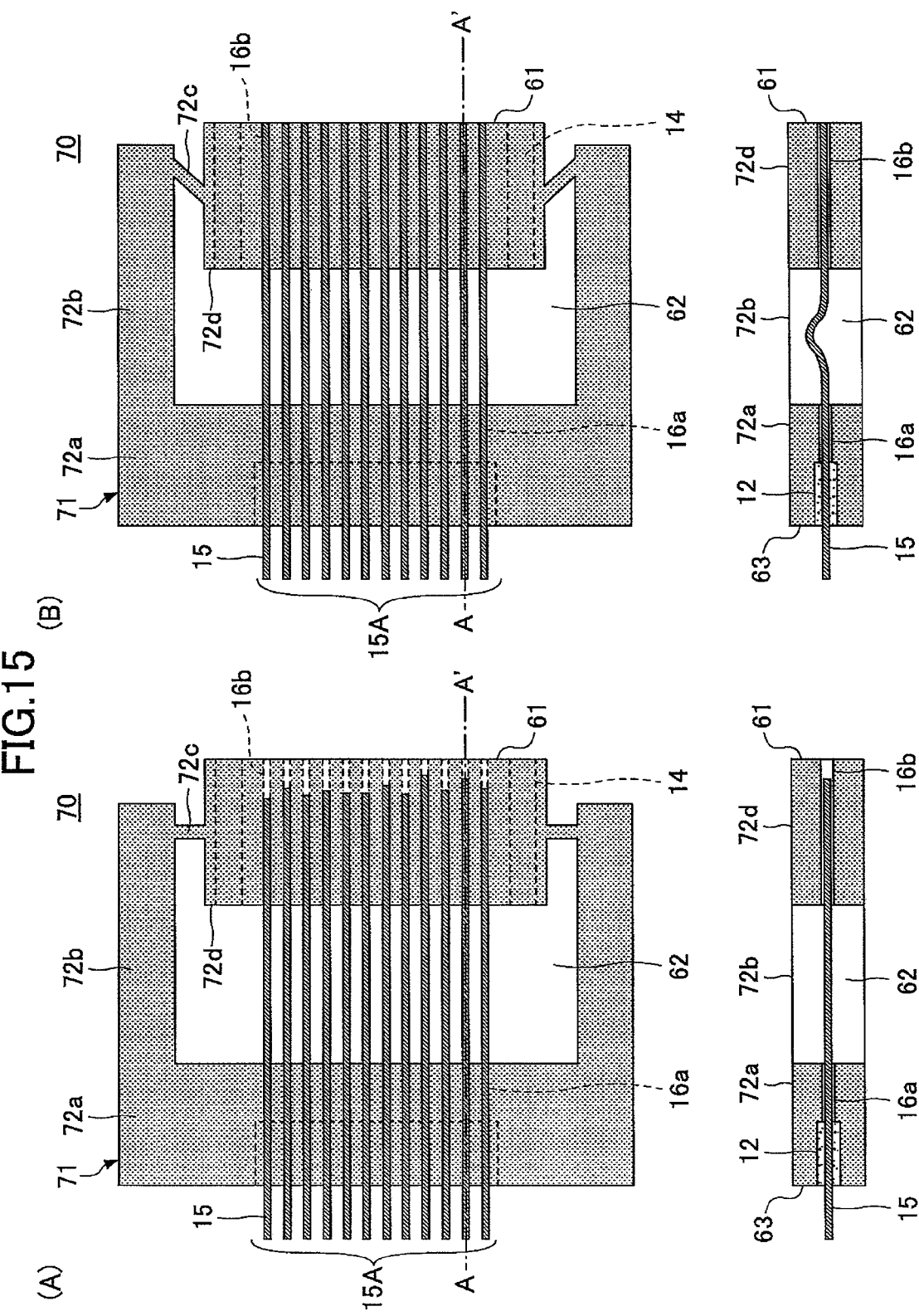
FIG. 15 illustrates how the ferrule of FIG. 14 deforms when the optical connector is fit into a counterpart connector.

FIG. 14 and FIG. 15 illustrate an optical connector 70 according to the fourth embodiment. In the fourth embodiment, a portion of a ferrule 71 is shaped into beams such that a connection wall 72d with a contact face 61 is supported by support beams 72c, as illustrated in FIG. 14. In FIG. 14, the A-A' line is parallel to the light propagation direction. A top view of the ferrule 71 is in the center. A rear view representing a rear end face 63 of a base wall 72a and a front view including a contact face 61 that comes into contact with a counterpart connector are arranged on the left-hand side and the right-hand side of the top view, respectively. A side view of the ferrule 71 is arranged under the top view in the page. In the top view, fiber guide holes 16a and a fiber bonding space 65 are whitened for the clarification purpose.

The ferrule 71 includes the base wall 72a and a side walls 72b, in addition to the connection wall 72d and the support beams 72c. The support beams 72c connect the connection wall 72d to the side walls 72b. The connection wall 72d has fiber guide holes 16b, and guide pin holes 14 formed on either side of an array of the fiber guide holes 16b. The base wall 72a has fiber guide holes 16a for receiving optical fibers and the fiber bonding space 65 in which the optical fibers are bonded. A space 62 is formed between the base wall 72a and the connection wall 72d to absorb bend of optical fibers.

The support beams 72c are made thin to reduce the rigidity and provide flexibility to the ferrule 71. The thickness of the support beams 72c is, for example, 0.5 mm, the length of the connection wall 72d and the fiber guide holes 16b along the A-A' line is, for example, 4 mm, and the length of the space 62 along the A-A' line is, for example, 4 mm.

FIG. 15 illustrates how the optical connector 70 is connected to a counterpart connector (not shown). FIG. 15 (A) illustrates a disconnected state of the optical connector 70 in which the optical fiber array 15A is incorporated in the ferrule 71. The optical fibers 15 of the optical fiber array 15A are inserted in the ferrule 71 through the associated fiber guide holes 16a and the bend absorbing space 62 and guided into the fiber guide holes 16b of the connection wall 72d. The leading ends of the optical fibers 15 are not aligned due to length variation in the cut end of the optical fibers. All the optical fibers 15 are retracted behind the contact face 61 in the fiber guide holes 16b.

The optical fiber array 15A is bonded to the base of the ferrule 71 by an adhesive 12. In this state, there is no bend occurring either in the ferrule 71 or the optical fibers 15.

FIG. 15 (B) illustrates a connected state of the optical connector 70. The contact face 61 is pressed against the ferrule of the counterpart connector (not shown) and receives a pressing force under the physical contact. The entirety of the connection wall 72d supported by the support beams 72c is pushed back toward the base. Along with the movement of the connection wall 72d, the support beams 72c deform toward the base, and the length of the ferrule 71 along the A-A' line decreases. The optical fibers 15 move forward relatively in the fiber guide holes 16*b* to the position aligning the contact face 61. The optical fibers 15 successively come into contact with the counterpart optical connector at the contact face 61. Since the optical fibers 15 are bonded by the adhesive 12 at the base, the optical fibers 15 start bending in the space 62 under an additional pressing force applied.

The support beams 72*c* elastically deform, which causes the connection wall 72*d* with fiber guide holes 16*b* to move in the light propagation direction. The configuration of the fourth embodiment can achieve the same effect as the first, the second and the third embodiments. The ferrule 71 is fabricated by injection molding using a single die, and the fabrication cost can be reduced. The offset structure illustrated in FIG. 7 may be combined with the optical connector 70 to allow the optical fibers 15 to bend in the same direction in the space 62.

Fifth Embodiment

FIG. 16 illustrates an optical connector 100 according to the fifth embodiment. A ferrule of any one of the first through fourth embodiments and optical fibers may be accommodated in a separate housing when used as an optical connector. In the fifth embodiment, a ferrule 81 is designed such that a part of it serves as a housing of the optical connector 100.

As illustrated in FIG. 16 (A), the optical connector 100 has a space 82 which communicates with fiber guide holes 16 for receiving the optical fibers 15. The ferrule 81 includes a base member 81A that functions as a housing, a connection member 81C having a contact face 84 which comes into contact with a counterpart connector, and an intermediate member 81B positioned between the base member 81A and the connection member 81C. The space 82 is formed in the connection member 81C.

The intermediate member 81B is made of an elastic material which is deformable under a contact pressure during connection with the counterpart connector. The connection member 81C is projecting in the light propagation direction from the leading end 86 of the base member (housing) 81A in the initial position, taking into account the deformation of the intermediate member 81B during connection. When the contact face 84 of the connection member 81 is pressed against the counterpart connector and receives a pressing force, the intermediate member 81B deforms and the contact face 84 is pushed back to the position aligning with the leading end 86 of the housing 81A. As the contact face 84 moves back, the space 82 moves toward the base, and the optical fibers 15 relatively move forward in the fiber guide hole 16 to the contact face 84. When the respective optical fibers 15 come into contact with the counterpart connecter at the contact face 84, optical connection is achieved. The optical fibers 15 with surplus lengths bend in the space 82.

Figure 17:
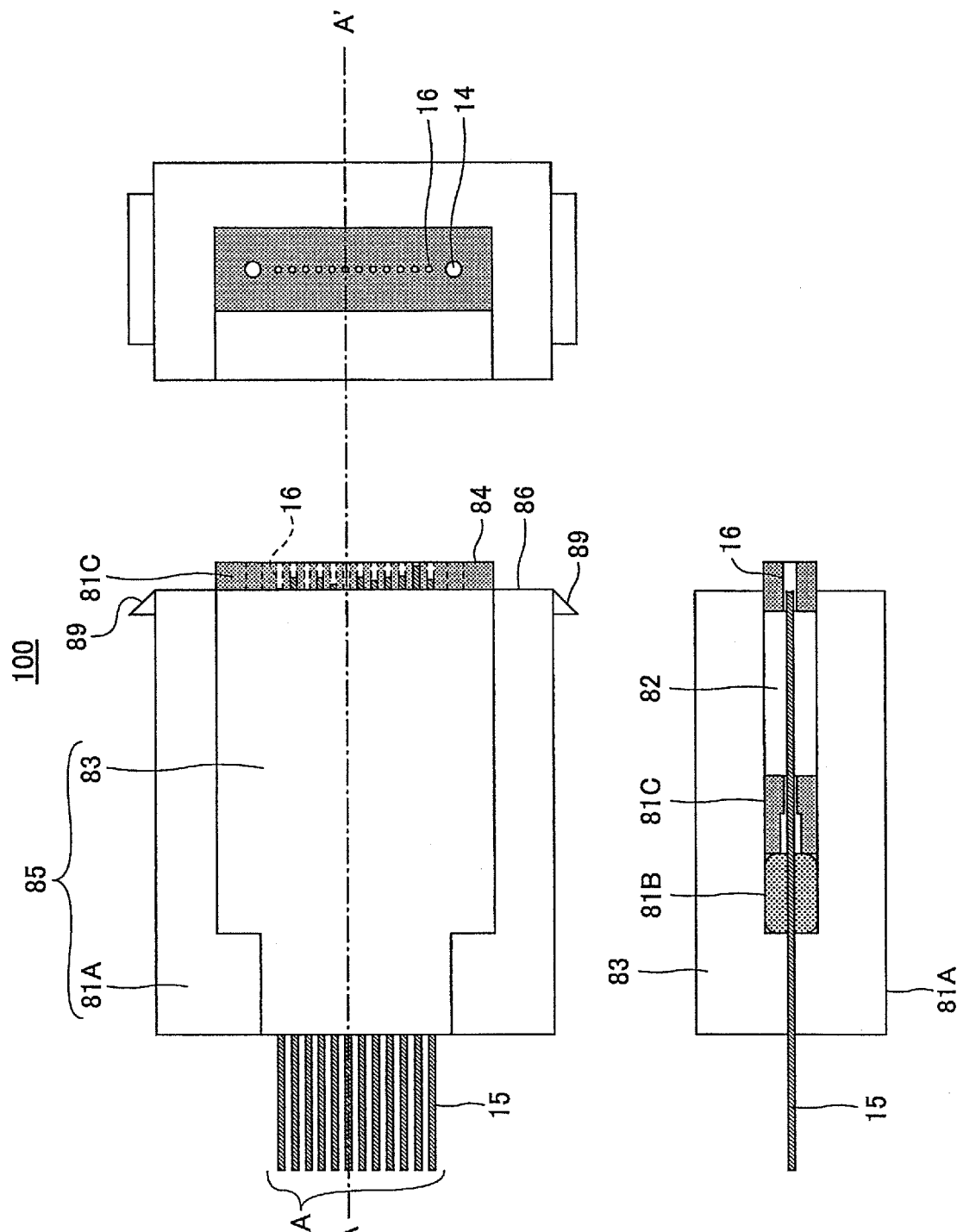
FIG. 17 illustrates the optical connector of FIG. 16 with the housing cover closed.

In the actual use, a housing cover 83 illustrated in FIG. 16 (B) is put over the structure of FIG. 16 (A) to complete the optical connector 100. The optical fiber array 15A is securely held between the base member 81A and the housing cover 83. The base member 81 and the housing cover 83 form a mechanical clamp. Application of an adhesive and the bonding process for bonding the optical fiber array 15A can be omitted FIG. 17 illustrates the optical connector 100 assembled with the housing cover 83. The base member 81A and the housing cover 83 form the housing 85 of the optical connector 100. The contact face 84 of the connection member 81C is projecting from the leading end 86 of the housing 85. The cut ends of the optical fibers 15 are not aligned in the fiber guide holes 16 formed in the connection member 81C.

Figure 18:
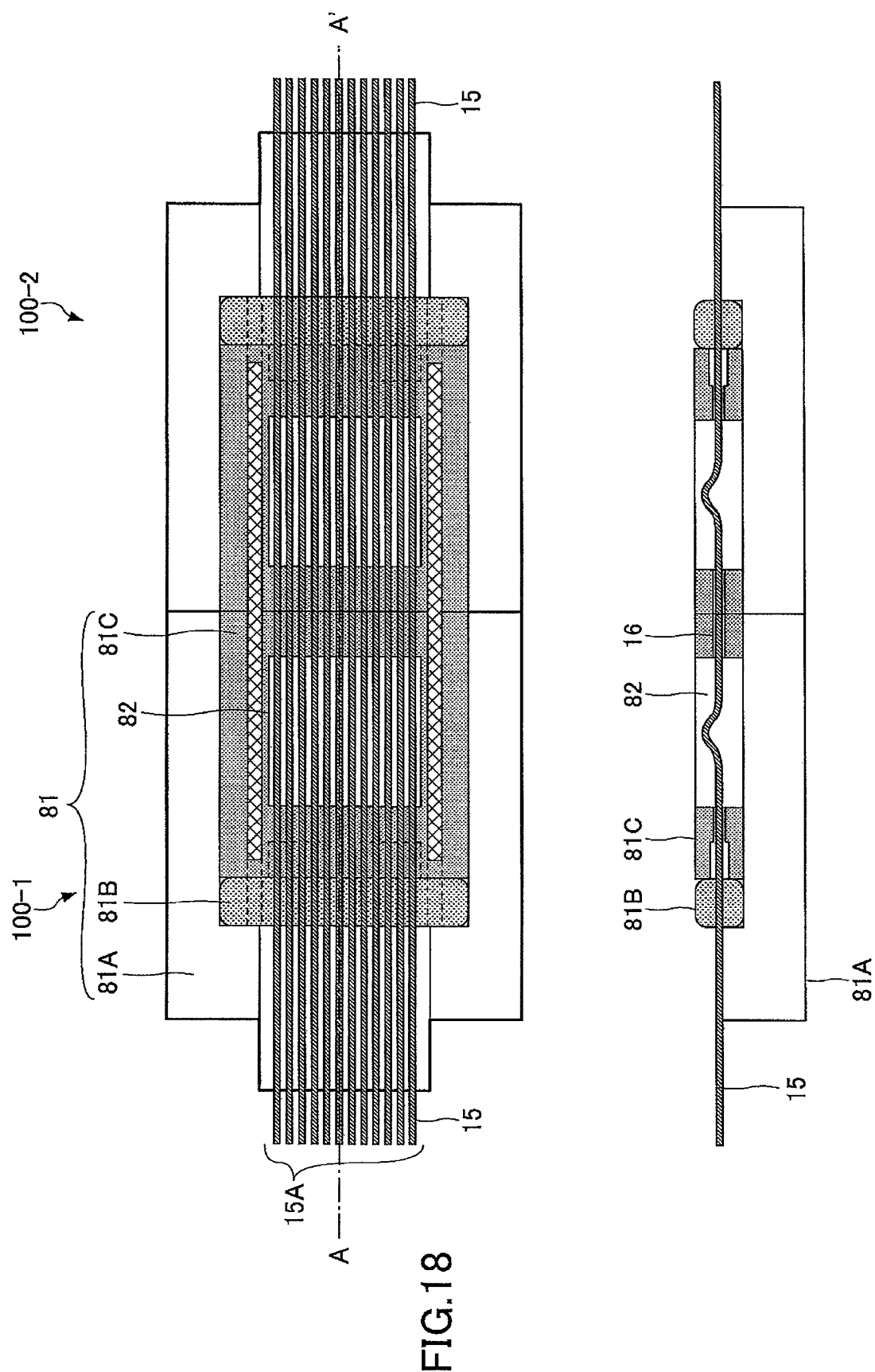
FIG. 18 illustrates the optical connector of FIG. 15 connected to a counterpart connector.

FIG. 18 illustrates a connection between optical connectors 100-1 and 100-2 illustrated in FIG. 17. For the clarification purpose, the housing cover 83 is omitted. The connection member 81C of the ferrule 81 of the optical connector 100-1 has come into contact with the counterpart connector 100-2. The intermediate member 81B has deformed and the space 82 has been displaced. The optical fibers 15 of the optical fiber array 15A have relatively moved to the contact position with the counterpart connector 100-2 and are optically connected to the optical fibers 15 of the counterpart connector 100-2. Due to the elastic compression of the intermediate member 81B, the optical fibers 15 with surplus lengths bend in the space 82. With this arrangement, the optical connectors 100-1 and 100-2 are optically connected to each other in a reliable manner in spite of the length variation in the cut ends of the optical fiber array 15A.

Although not illustrated in FIG. 18, a latch mechanism 89 may be provided to the base member 81A of the optical connector 100 as illustrated in FIG. 16 and FIG. 17. The latch mechanism 89 can enhance the secure connection between the optical connectors 100-1 and 100-2.

The above-described embodiments are presented only as exemplifications, and there are many alterations or substitutions using the basic idea of the optical connectors of the embodiments. A general-purpose housing of a multi-fiber push-on (MPO) connector may be used to accommodate the optical fibers of the above-described embodiments. A polymer waveguide held in a PMT ferrule may be used as a propagation path of a counterpart connector to be connected to the optical connector of the embodiment. The optical connectors of the embodiments are applicable to various modes fir connecting optical propagation paths.

In the first embodiment, the internal spaces 22*a*, 22*b* and 22*c* are formed in the base member 11A, intermediate member 11B, and the connection member 11C, respectively. However, the internal space may be provided only in the intermediate member 11B, or in the intermediate member 11B and either one of the base member 11A and the connection member 11C, as long as bending of the optical fibers is accommodated. In the fifth embodiment the connection member 81C providing the space 82 and the intermediate member (elastic member) 81B for shifting the space 82 (to relatively move the optical fibers) are fabricated as separate members. However, these members may be formed collectively using an elastic material.

The structures and modifications of the embodiments can compensate for length variation in the cut ends of the optical fibers even if the cut ends are unpolished after the installation. When the optical connectors and the modifications of the embodiments are applied to electronic information equipment as illustrated in FIG. 1, optical connection between a backplane board and daughter boards on which various electronic devices are mounted is achieved. Reliable electronic information equipment (such as routers or servers) is realized with mutual connection and disconnection of optical fibers facilitated and assured.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical connector, comprising:
a fiber holder with guide holes for guiding optical fibers, the guide holes communicating with a space, and the optical fibers being accommodated in the space; and
a deformable member that forms at least a part of the fiber holder and causes the space to deform or displace to allow a part or all of the optical fibers to bend in the space,
wherein the deformable member is a part of the fiber holder and made of an elastic material to cause the space to deform or displace in a direction of light propagation, and
wherein a Young's modulus of the elastic member is at most 10 MPa.

2. The optical connector according to claim 1, wherein:
the deformable member is an elastic member positioned between a first holder member to secure the optical fibers at a base of the optical connector and a second holder member to hold the optical fibers at a leading end of the optical connector, and
the elastic member defines the space together with at least one of the first holder member and the second holder member.

3. The optical connector according to claim 1, wherein
the deformable member is an elastic member positioned between a first holder member to secure the optical fibers at a base of the optical connector and a second holder member having a contact face that comes into contact with a counterpart connector and defining the space, and
the elastic member causes the space to displace in the light propagation direction.

4. An optical connector, comprising:
a fiber holder with guide holes for guiding optical fibers, the guide holes communicating with a space, and the optical fibers being accommodated in the space; and
a deformable member that forms at least a part of the fiber holder and causes the space to deform or displace to allow a part or all of the optical fibers to bend in the space,
wherein the deformable member is a flexible member forming a part of the fiber holder with a reduced thickness and defining the space, and
wherein the fiber holder includes a first wall to secure the optical fibers at a base of the optical connector and a second wall having a contact face that comes into contact with a counterpart connector, and
the flexible member is side walls with the reduced thickness extending between the first wall and the second wall to define the space.

5. An optical connector, comprising:
a fiber holder with guide holes for guiding optical fibers, the guide holes communicating with a space, and the optical fibers being accommodated in the space; and
a deformable member that forms at least a part of the fiber holder and causes the space to deform or displace to allow a part or all of the optical fibers to bend in the space,
wherein the deformable member is a flexible member forming a part of the fiber holder with a reduced thickness and defining the space, and
wherein the fiber holder includes a first wall to secure the optical fibers at a base of the optical connector, a second wall having a contact face that comes into contact with a counterpart connector, and side walls extending from the first wall; and
the flexible member is support beams having the reduced thickness and connecting the second wall to the side walls.

6. The optical connector according to claim 1, wherein a line of the guide holes is positioned offset from a plane parallel to an array of the optical fibers including a light propagation center axis.

7. An optical connector, comprising:
a fiber holder with guide holes for guiding optical fibers, the guide holes communicating with a space, and the optical fibers being accommodated in the space; and
a deformable member that forms at least a part of the fiber holder and causes the space to deform or displace to allow a part or all of the optical fibers to bend in the s space, wherein:
the guide holes include a first set of guide holes provided on a base side of the fiber holder with respect to the space and a second set of guide holes provided on a leading side of the fiber holder with respect to the space, and
a position of the first set of the guide holes is offset from a position of the second set of the guide holes in a thickness direction of the optical connector.

8. The optical connector according to claim 7, further comprising:
a guide mechanism to facilitate insertion of the optical fibers from the space into the second set of the guide holes.

9. The optical connector according to claim 7, wherein the fiber holder has a window to check insertion of the optical fibers into the second set of the guide holes.

10. The optical connector according to claim 1, wherein a part of the fiber holder serves as a housing of the optical connector.

11. The optical connector according to claim 10, wherein:
the fiber holder includes a first holder member to secure the optical fibers at a base of the optical connector and a second holder member to hold the optical fibers at a contact face of the optical connector that comes into contact with a counterpart connector, and
the first holder member serves as the housing of the connector.

12. The optical connector according to claim 11, further comprising:
a housing cover to be engaged with the first holder member, wherein the first holder member and the housing cover form a clamp to securely hold the optical fibers.

13. The optical connector according to claim 11, wherein the second holder member is projecting from a front end of the housing when the optical connector is disconnected.

14. The optical connector according to claim 10, wherein the housing has a latch mechanism.

15. The optical connector according to claim 1, further comprising:
an optical fiber array including the optical fibers and held in the fiber holder, wherein
the optical fibers are retracted in the associated guide holes when the optical connector is disconnected.

16. An optical fiber incorporating method, comprising:
inserting optical fibers into a first set of the fiber guide holes formed in a rear face of an optical connector and guiding the optical fibers through an internal space of the optical connector toward a second set of the fiber guide holes formed in a front face of the optical connector, the optical fibers having cut ends having been cut collectively, the first set of the fiber guide holes and the second set of the fiber guide holes being offset from each other in a thickness direction of the optical connector;

holding the optical fibers in the first set of the fiber guide holes and the second set of the fiber guide holes, the optical fibers being retracted into the second set of the guide holes from the front face of the optical connector in a disconnected state of the optical fibers; and deforming the internal space of the optical connector to cause the optical fibers to move forward relative to the front face of the optical connector, while allowing the optical fibers with surplus lengths to bend in the internal space, when the optical connector is connected to a counterpart connector.

17. Electronic information equipment, comprising:

a board having an optical propagation path;

one or more electronic-device mounting boards attached to the board; and one or more optical connectors to optically connect between the electronic-device mounting boards and the board, wherein at least one of said one or more optical connectors comprises:

a fiber holder with guide holes for guiding optical fibers;

a space communicating with the guide holes and to accommodate the optical fibers; and a deformable member that forms at least a part of the fiber holder and causes the space to deform or displace to allow a part or all of the optical fibers to bend in the space.

18. The optical connector according to claim 7, wherein a part of the fiber holder serves as a housing of the optical connector.

19. The optical connector according to claim 7, further comprising:

an optical fiber array including the optical fibers and held in the fiber holder, wherein the optical fibers are retracted in the associated guide holes when the optical connector is disconnected.

20. An optical connector, comprising:

a fiber holder with guide holes for guiding optical fibers, the guide holes communicating with a space, and the optical fibers being accommodated in the space; and a deformable member that forms at least a part of the fiber holder and causes the space to deform or displace to allow a part or all of the optical fibers to bend in the space, wherein a line of the guide holes positioned at a front end face of the fiber holder is offset from an array of the optical fibers held at a rear end face of the fiber holder in a thickness direction of the fiber holder.

\* \* \* \* \*